US005402336A

United States Patent [19]
Spiegelhoff et al.

[11] Patent Number: 5,402,336
[45] Date of Patent: Mar. 28, 1995

[54] SYSTEM AND METHOD FOR ALLOCATING RESOURCES OF A RETAILER AMONG MULTIPLE WHOLESALERS

[75] Inventors: Steven Spiegelhoff, Mukwonago; Joseph Kraetz, Milwaukee, both of Wis.

[73] Assignee: SS&D Corporation, Mukwonago, Wis.

[21] Appl. No.: 5,248

[22] Filed: Jan. 15, 1993

[51] Int. Cl.6 .............................................. G06F 15/24
[52] U.S. Cl. ...................................... 364/401; 364/403
[58] Field of Search ................. 364/401, 402, 403, 406

[56] References Cited

U.S. PATENT DOCUMENTS

| | | |
|---|---|---|
| 4,645,873 | 2/1987 | Chomet . |
| 4,677,552 | 6/1987 | Sibley, Jr. . |
| 4,744,028 | 5/1988 | Karmarkar . |
| 4,775,935 | 10/1988 | Yourick . |
| 4,799,156 | 1/1989 | Shavit et al. . |
| 4,959,686 | 9/1990 | Spallone et al. . |
| 4,992,940 | 2/1991 | Dworkin . |
| 5,060,165 | 10/1991 | Schumacher et al. . |
| 5,063,506 | 11/1991 | Brockwell et al. .................. 364/401 |
| 5,126,936 | 6/1992 | Champion et al. . |
| 5,191,523 | 3/1993 | Whitesage ........................... 364/401 |
| 5,224,034 | 6/1993 | Katz et al. ........................... 364/401 |
| 5,237,499 | 8/1993 | Garback ............................... 364/401 |
| 5,291,396 | 3/1994 | Calcerano et al. .................. 304/401 |

Primary Examiner—Robert A. Weinhardt
Attorney, Agent, or Firm—Nilles & Nilles

[57] ABSTRACT

A computerized system receives an input request from the orderer for a retailer, of searching selected wholesalers, and of then comparing these wholesalers to one another so as to provide a desired allocation of resources among these selected wholesalers. The system is preferably capable of searching both the warehouse of a primary wholesaler and the warehouses of a number of secondary wholesalers and of allocating resources so as to meet designated ordering criterion or constraints for the warehouse of the primary wholesaler. The search may be performed, for example, on the basis of net price per unit item or on the basis of net price per unit weight or per unit volume. The system preferably automatically creates an order file which can be transmitted to the selected warehouses to order the selected products but which can be manually edited prior to transmission.

13 Claims, 13 Drawing Sheets

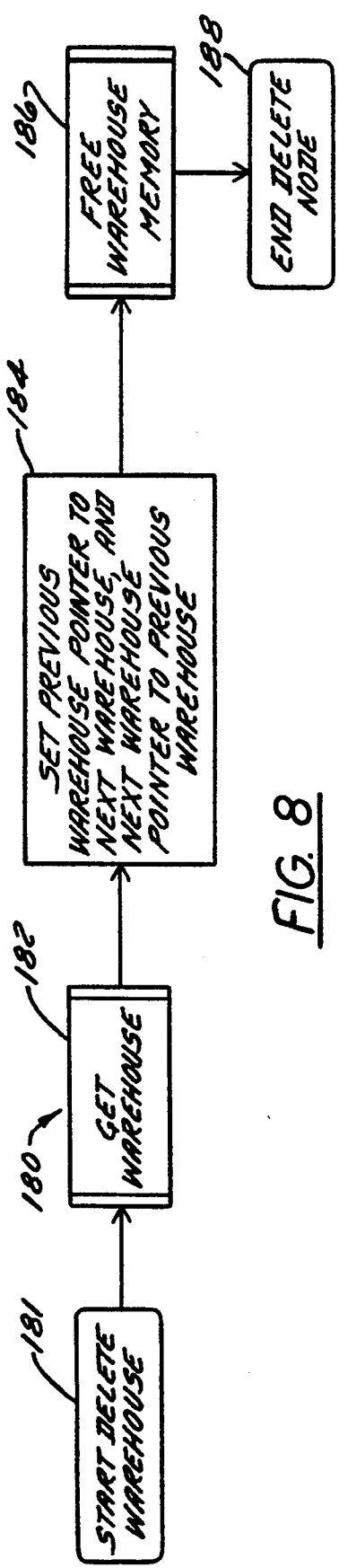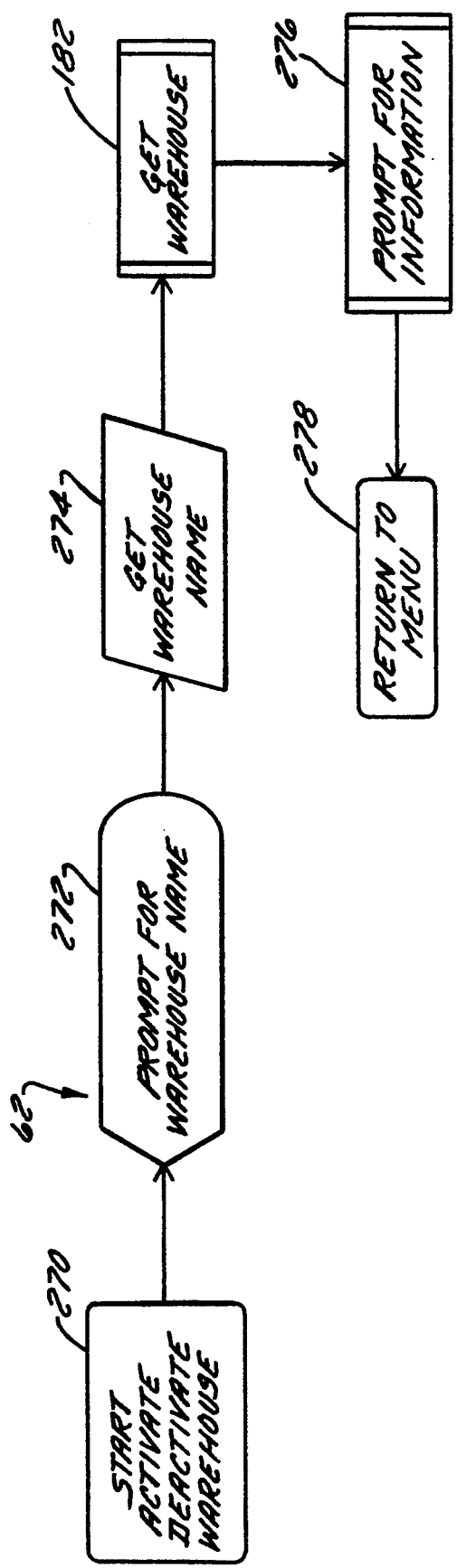

SYSTEM AND METHOD FOR ALLOCATING RESOURCES OF A RETAILER AMONG MULTIPLE WHOLESALERS

BACKGROUND OF THE INVENTION

1. Field of the Invention

The invention relates to a resource allocation systems and methods, and more particularly relates to a system and method for allocating the resources of a retailer such as a grocer among a plurality of wholesalers.

2. Discussion of the Related Art

Retailers typically order anywhere from a few to a relatively large quantity of each of a plurality of items from one or more wholesalers. Many wholesalers have computerized ordering systems which may be linked to retailers by modem or which may receive orders from retailers via computerized files on disks or via a manual order sheet which is input into the wholesaler's computer at the wholesaler's warehouse.

Although retailers may have access to information about the prices being demanded by wholesalers for various products, they have heretofore not been able to economically allocate their resources among more than one warehouse. For example, up until now, if a retailer desired to obtain its products at the lowest possible price, it had to obtain a hard copy of the prices being demanded by each of its suppliers and to manually compare the prices being demanded by its suppliers and to select the lowest-priced supplier based upon this manual comparison. This comparison was rendered more difficult by the fact that most wholesalers offer various rebates to their retailers while at the same time adding shipping costs to the price. Allocating resources so as to obtain products at the lowest net price thus is typically a very time-consuming and uneconomical procedure for most retailers. As a result, many retailers obtain most or all of their products from a single primary wholesaler without any price comparison. This can lead to a very inefficient allocation of resources, particularly in instances in which a retailer is ordering a relatively small number of each of a high number of items.

Even those retailers which do attempt to allocate resources based on price are, as a practical matter, incapable of allocating resources based upon other criterion such as cost per unit weight or per unit volume because such comparisons require still further calculations rendering such comparisons uneconomical. A need therefore exists for economically comparing wholesalers to one another based upon price or some other criterion.

Allocating resources becomes even more difficult when a retailer is obligated by contract, by weight or volume constraints, or by some other criterion to obtain a designated minimum or maximum amount of goods from a particular supplier. Allocating resources among one or more suppliers under this type of constraint may require a plurality of iterations rendering a useful comparison of suppliers to one another practically impossible. A need therefore exists for automatically allocating the resources of a retailer among various wholesalers while meeting real-world criteria.

Some computerized systems are currently available for permitting comparison among various suppliers. However, none of these systems is designed for use by retailers for ordering products from wholesalers, and none is capable of automatically creating an order file for ordering the goods demanded by the retailer. For instance, U.S. Pat. No. 4,992,940, which issued to Ross E. Dworkin on Feb. 12, 1991, discloses an automated system permitting consumers to compare the goods being offered by one or more vendors and to obtain a listing of various information about price and availability of the product. U.S. Pat. No. 5,063,506, which issued to Brockwell et al. on Nov. 5, 1991, discloses a similar system for permitting a manufacturing facility to optimize its cost when ordering parts from various suppliers. U.S. Pat. No. 5,060,165, which issued to Schumacher et al. on Oct. 22, 1991, discloses a computerized system for optimizing mail processing by matching publisher and printer entities. None of the systems disclosed in these patents is suitable for use by a retailer when ordering parts from a wholesaler and none is capable of creating order files for such wholesalers. In addition, none of the systems disclosed in these patents is capable of allocating resources while still obtaining the required maximum or minimum value from a particular supplier.

OBJECTS AND SUMMARY OF THE INVENTION

It is therefore an object of the invention to provide a system which permits a retailer to optimize its resources among a plurality of wholesalers.

In accordance with this aspect of the invention, the system includes means, containing information about the warehouses, for receiving orders from an orderer for the retailer and for conveying information about items to the orderer, and means, electronically linked to the means (A) and being accessible by the orderer for the retailer, for receiving the information from the warehouses and for ordering items from the warehouses. The means (B) includes (i) means for obtaining the information about one of the items from at least two of the warehouses, (ii) means for evaluating the information, obtained by the means (i), and for selecting one of the at least two warehouses based on a predetermined criterion, and (iii) means, electronically linked to the means (ii), for automatically creating an order file for ordering the item from the selected warehouse. Preferably, the means (A) and the means (B) comprise digital computers.

In one particularly preferred aspect of the invention, the means (i) obtains information relating to prices of items, and the means (ii) determines, for each item, the net price per unit item demanded by each of the warehouses, and selects the warehouse demanding the lowest price per unit item.

It is another object of the invention to provide a system which permits a retailer to optimize its resources among a plurality of wholesalers while meeting designated ordering criteria for at least one of the wholesalers.

In accordance with this aspect of the invention, the warehouses described above comprise a primary warehouse and at least one secondary warehouse, and the means (B) further comprises (iv) means for determining whether a designated ordering criterion for the primary warehouse is met and, if the designated ordering criterion is not met, for causing the means (ii) to determine a revised allocation of resources which meets the designated ordering criterion for the primary warehouse. The designated ordering criterion by be a minimum number of items, a maximum volume, or a maximum weight.

Another object of the invention is to provide a system of the type discussed above which is user friendly and which is flexible enough to accommodate changes of and in wholesalers and to meet the changing needs of retailers, and to permit retailers to alter orders generated by the system so as to allocate resources in a manner not taken into account by the system.

In accordance with this aspect of the invention, the means (B) may further comprise means for transmitting the order file to the selected warehouse, thus ordering the item, and means for calculating and displaying the total costs and savings of items ordered from each of the warehouses. The means (B) may still further include means for permitting the manual editing of the order file prior to transmission to the selected warehouse.

Preferably, in order to preclude unnecessary searching, the means (B) further comprises means for activating a designated number of the secondary warehouses prior to the operation of the means (ii), the means (i), obtaining information only from warehouses which have been activated.

Still another object of the invention is to provide methods of allocating the resources of a retailer among various wholesalers with or without designated ordering constraints.

In accordance with this aspect of the invention, the method includes (A) obtaining information about an item from computers of at least two of the warehouses, (B) evaluating, via the first computer, the information received from the warehouses, and (C) selecting, via the first computer, one of the at least two warehouses to deliver the item based on a predetermined criterion.

Other objects, features, and advantages of the present invention will become apparent to those skilled in the art from the following detailed description. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being made to the accompanying drawings in which like reference numerals represent like parts throughout and in which:

FIGS. 7–9 are flow charts of subroutines of the routine illustrated in FIG. 6;

FIG. 11 is a flow chart of the routine of another choice illustrated in FIG. 3;

DETAILED DESCRIPTION OF THE PREFERRED EMBODIMENTS

Resume

Pursuant to the invention, a computerized system is provided which is capable of receiving an input request from the orderer for a retailer, of searching selected wholesalers, and of then comparing these wholesalers to one another so as to provide a desired allocation of resources among these selected wholesalers. The system is preferably capable of searching both the warehouse of a primary wholesaler and the warehouses of a number of secondary wholesalers and of allocating resources so as to meet designated ordering criterion or constraints for the warehouse of the primary wholesaler. The search may be performed, for example, on the basis of net price per unit item or on the basis of net price per unit weight or per unit volume. The system preferably automatically creates an order file which can be transmitted to the selected warehouses to order the selected products but which can be manually edited prior to transmission.

System Overview

Figure 1:
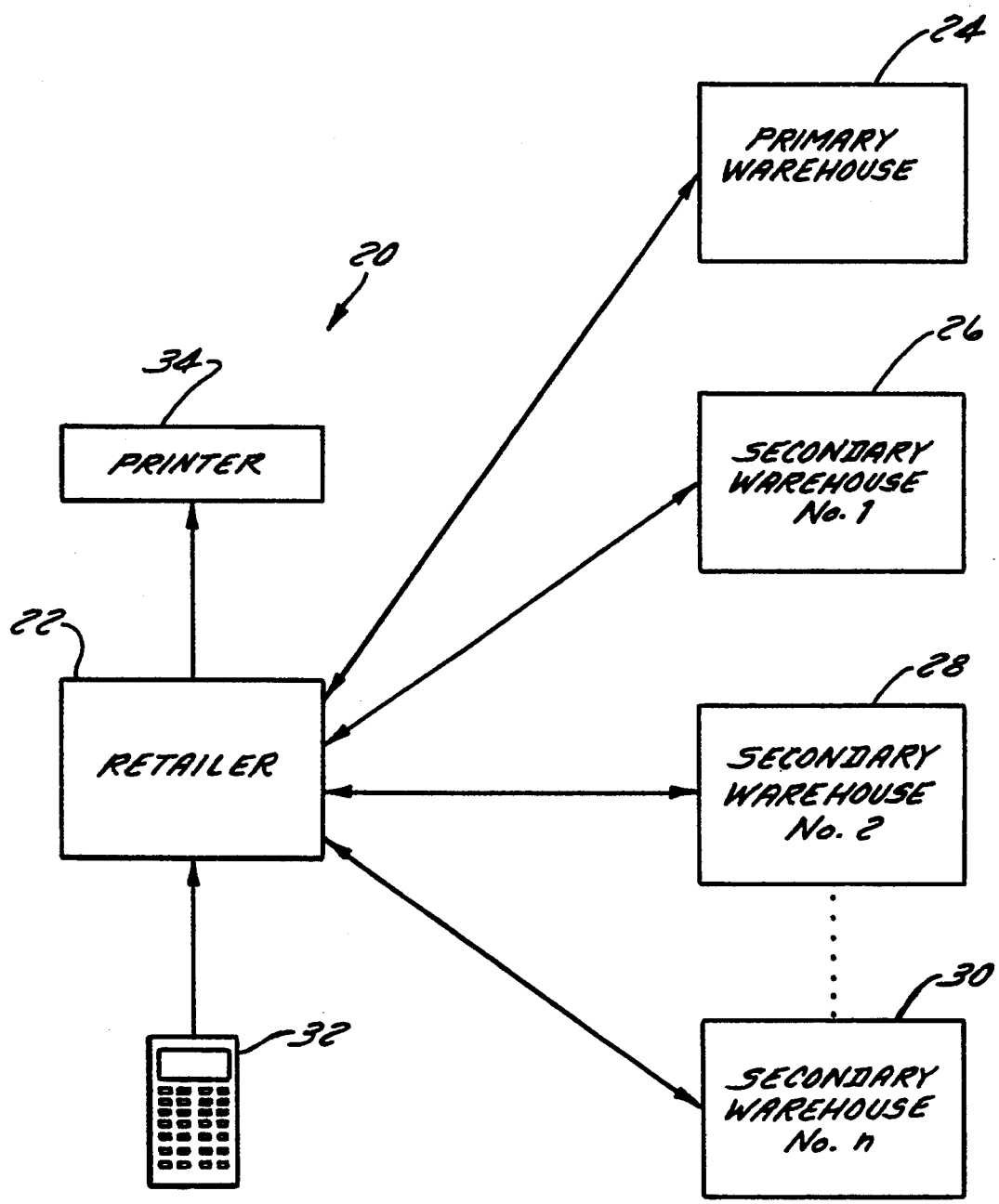
FIG. 1 schematically illustrates a system for allocating the resources of a retailer among the warehouses of a primary wholesaler and "n" number of secondary wholesalers.
Figure 2:
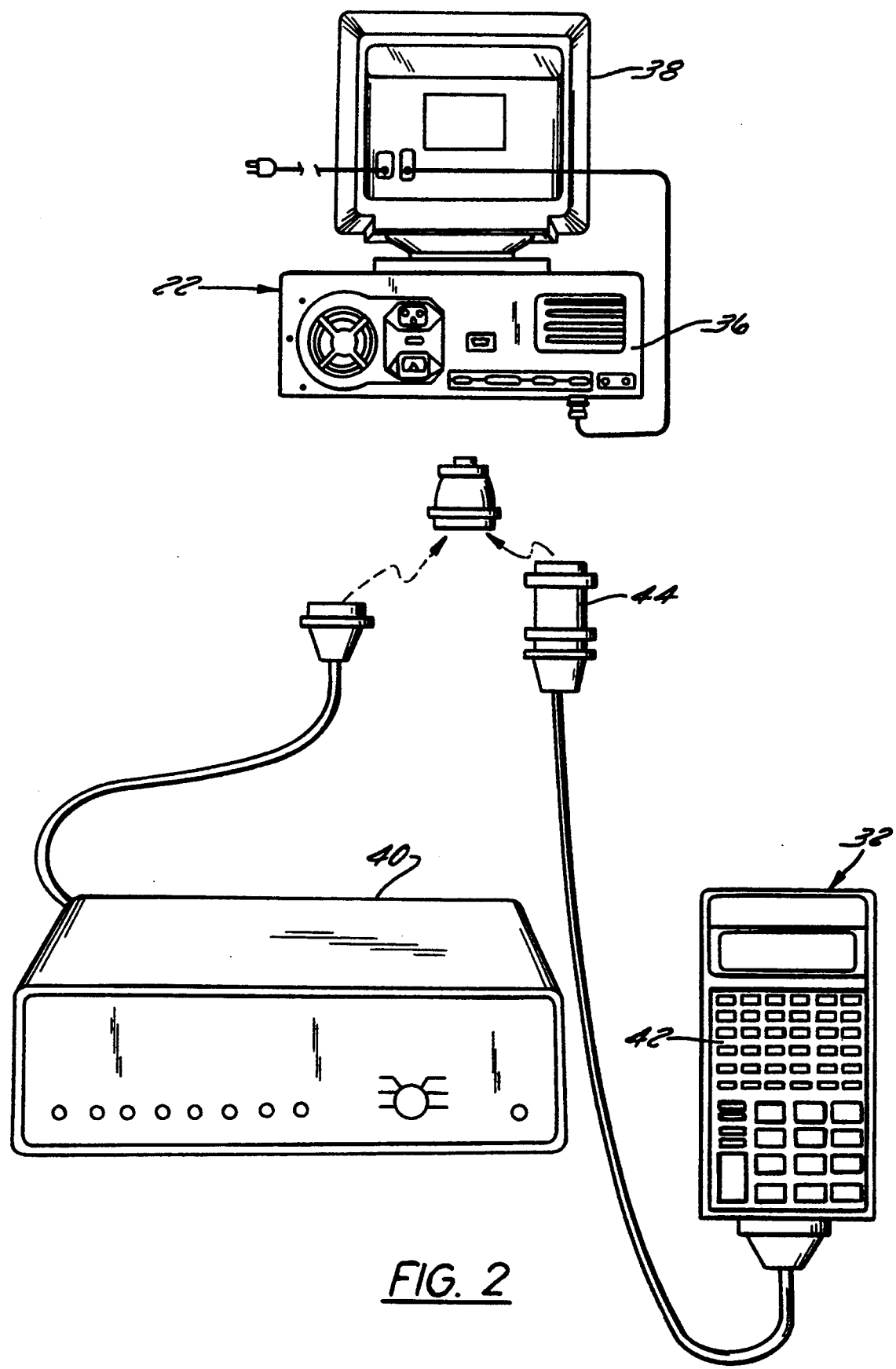
FIG. 2 illustrates possible hardware, used by the orderer for a retailer, of the system of FIG. 1.

Referring to FIGS. 1 and 2, a resource allocation system 20 is designed to permit an orderer for a retailer to obtain information from a so-called "primary" wholesaler or warehouse and a plurality of so-called "secondary" wholesalers or warehouses and to compare and correlate the information thus obtained. A "primary" wholesaler or warehouse as used herein means one which for whatever reason is preferred by a retailer under at least some circumstances. For example, a retailer may be contractually obligated to obtain a certain percentage of products purchased from a particular wholesaler or warehouse. Even if such a contractual obligation does not exist, the retailer may desire to order a minimum or maximum amount of goods to be purchased from a certain wholesaler or warehouse for some other reason. For instance, a retailer may desire to order a shipment from a designated or "primary" warehouse which does not exceed a predetermined weight or a predetermined volume. Any other of a wide variety of criterion could be used for selecting a primary warehouse over other "secondary" warehouses. "Secondary" warehouses are all warehouses other than the primary warehouse which are subject to search.

The retailer may be a supermarket, a hardware store, or virtually any other enterprise which buys many different items from at least two warehouses. The discussion which follows and the specific examples contained therein will be directed primarily towards supermarkets because supermarkets historically are extremely competitive and thus sell items to their customers at prices which exceed their net cost by a relatively small amount. Supermarkets also typically order dozens or even hundreds of different types of items at one time. Thus, maximization of resource allocation is particularly important to supermarkets but is at the same time particularly difficult, thus rendering the present invention ideally suited for use by orderers for supermarkets.

The orderer for the retailer will preferably work from a first computer 22 which is functionally connected to the computer 24 for a primary warehouse and to computers 26, 28 and 30 for secondary warehouses 1, 2 and "n". The designation of "n" secondary warehouses illustrates that any number of warehouses could be tied into the computer 22 for the retailer.

Computer 22 will typically be located on the retailer's premises and will be electronically connected, e.g., via modem, to the computers 24, 26, 28 and 30. However, this need not necessarily be the case. For instance, if an electronic connection is not possible for whatever reason, information could be conveyed back and forth between the retailers computer 22 and the wholesalers or warehouse computers 24, 26, 28, and 30 via diskette, hard copy, or any other mechanism for communication. In addition, the individual computers need not be physically located on the premises of the retailers and the warehouses, but could conceivably be operated by personnel located at other locations. Thus, as used herein, the discussion of computers as being located at the warehouses should be understood to mean that such computers contain information about those warehouses and can be used to order goods from those warehouses. Similarly, discussion of a computer as being located at a retailer should be understood to mean merely that the computer is accessible to an orderer for the retailer having information about goods demanded by the retailer. Such an orderer need not be located on the premises of the retailer.

When the computer 22 is electronically linked to the computers 24, 26, 28, and 30, each link should be designed so as to permit information to be conveyed back and forth between the retailer computer 22 and the warehouse computers. Data transfer will typically be controlled by the retailer's computer 22. In this case, conveyance of signals will entail the transmission of data from the computer 22 to the computers 24, 26, 28, 30, and the extraction of data from the computers 24, 26, 28, 30 by the computer 22.

The computer 22 of the retailer, in addition to being linked to the computers of the primary and secondary warehouses, should be capable of receiving input requests from the orderer and of displaying information to the orderer. In the illustrated embodiment, information from the orderer is input via conventional keyboard and via an ordering device 32. Information contained in the computer 22 can be displayed on a conventional monitor 38 (FIG. 2) and can also be transmitted to a conventional printer 34 for preparation of a hard copy.

Each of the computers 22, 24, 26, 28, and 30 can take any of a wide variety of forms. The computers of the primary and secondary warehouses are typically relatively large (main frame) computers storing a great deal of information, and the computer 22 for the retailer will more likely be a standard personal computer illustrated in FIG. 2. The computer 22 preferably includes a standard main unit 36 outputting a display to monitor 38 and being connected to a modem 40 and to the ordering device 32. The modem 40 and device 32 can be connected to separate terminals of the unit 36 or, if the unit lacks such capabilities, can be alternately plugged into the same connector.

Modem 40 could be any modem capable of providing communication between the retailer's computer 22 and the warehouses' computers 24, 26, 28, and 30. However, in the illustrated embodiment in which the retailer's computer 22 is a personal computer and the remaining computers are main frames, the modem is a V. 23 type-modem or some other modem capable of providing communications between personal computer 22 and the main frame computers. Other, more conventional modems could be used if the wholesalers' capabilities are adjusted to accommodate such a modem unit 36 is a conventional central processor having a RAM, a ROM, a BUS, and other components of an off-the-shelf processor.

Data entry device 32 could be any device capable of inputting to the computer descriptions of products to be ordered and the quantity of each product to be ordered. This information could be entered manually via the keyboard of computer 22. However, in the preferred embodiment, this information is transmitted to the unit 36 in batch form from the portable data terminal 32, which, for example, may be the one manufactured by MSI Corp. Such portable data terminals are conventionally used by retailers to create order files for goods. In use, the terminal is carried onto the floor of the retailer's premises, a code such as a UPC symbol for the product to be ordered is scanned, and the number of items of that product to be ordered are manually input via a keyboard 42 of device 32.

Heretofore, the content of the portable data terminal 32 would be output to a printer to create a list for the manual ordering of products from a wholesaler. Even the most sophisticated systems heretofore available merely transmitted the information stored in the portable data terminal 32 to a wholesaler as an order file. However, pursuant to the invention, the contents of the programmed portable data terminal 32 are transmitted in batch form through a null modem connector 44 to the unit 36. The data thus input is manipulated by the process discussed in more detail below and used in conjunction with information input by the keyboard of the computer 22 and by information received from the computers 24, 26, 28, etc. to create order files for the optimization of the retailer's resources. The discussion which follows describes ordering and programming options available to the orderer when using the present invention.

Description of Main Menu

Figure 3:
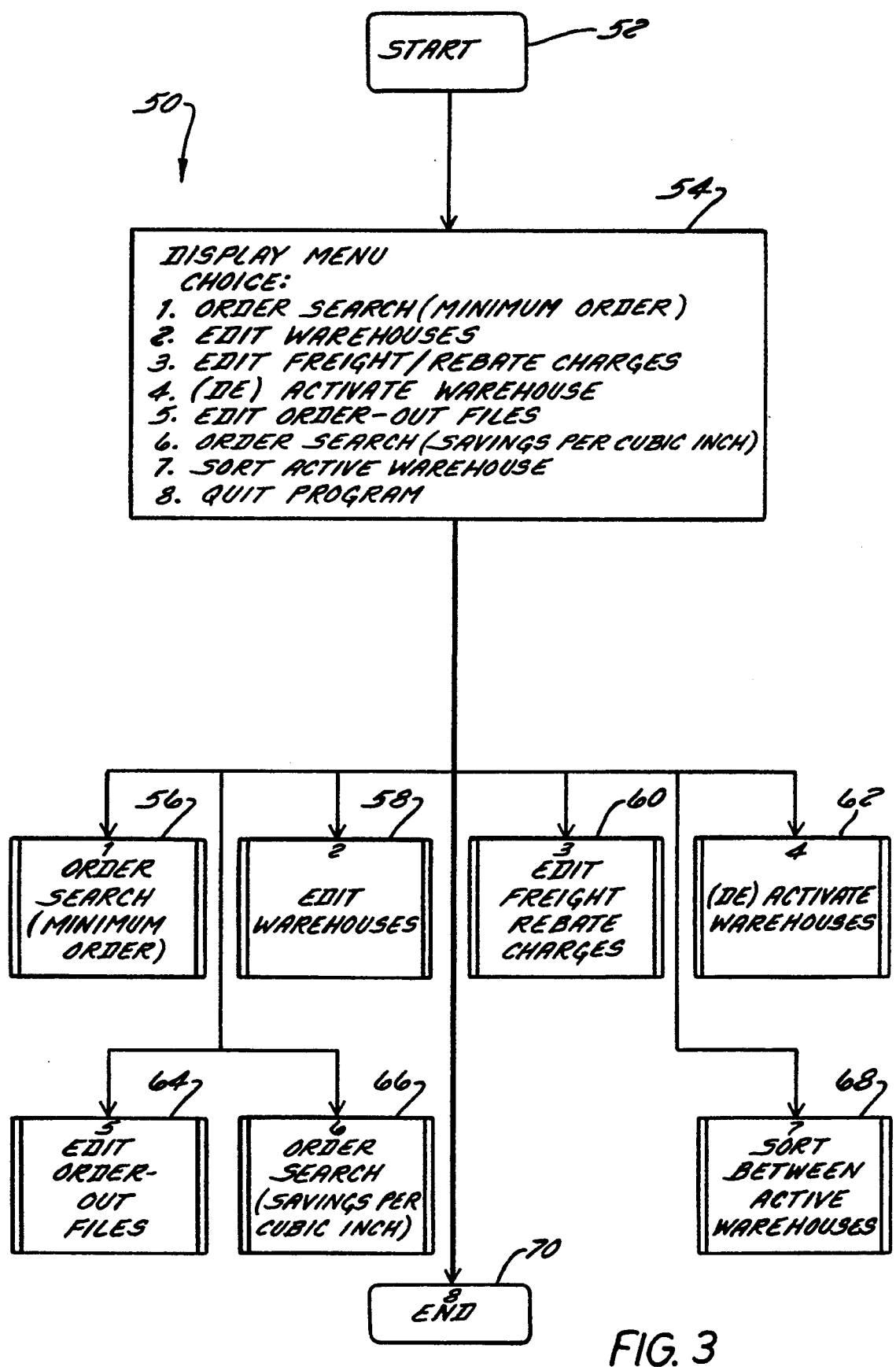
FIG. 3 illustrates a possible menu produced by the system of FIG. 2 and permitting the orderer for the retailer to choose one of a variety of operations.

Referring to FIG. 3, the user activates the resource allocation system by calling up a menu on the monitor 38 of computer 22 and by selecting one of the eight displayed options. Options 1 and 6 perform actual product sorts, compare the information received from warehouses 24, 26, 28, and 30 to one another, and create order files for these warehouses using designated criterion. Options 2–4 enable the orderer to update information about warehouses prior to running the searches of options 1 and 6. Option 5 enables the orderer to edit the order files created during the searches of options 1 or 6 prior to transmission of the order file to the selected warehouses. Finally, option 7 enables the orderer to simply compare the available warehouses to one another without actually creating order files. Option 8 ends the search session. In the illustrated embodiment, the routine for displaying this menu is illustrated generally by reference numeral 50 with the routine starting at block 52 and displaying the menu at block 54 and selecting one of the eight options discussed above via one of blocks 56, 58, 60, 62, 64, 66, 68, and 70. Each of the first seven options will now be discussed in turn.

Minimum Order Search Routine

Figure 4:
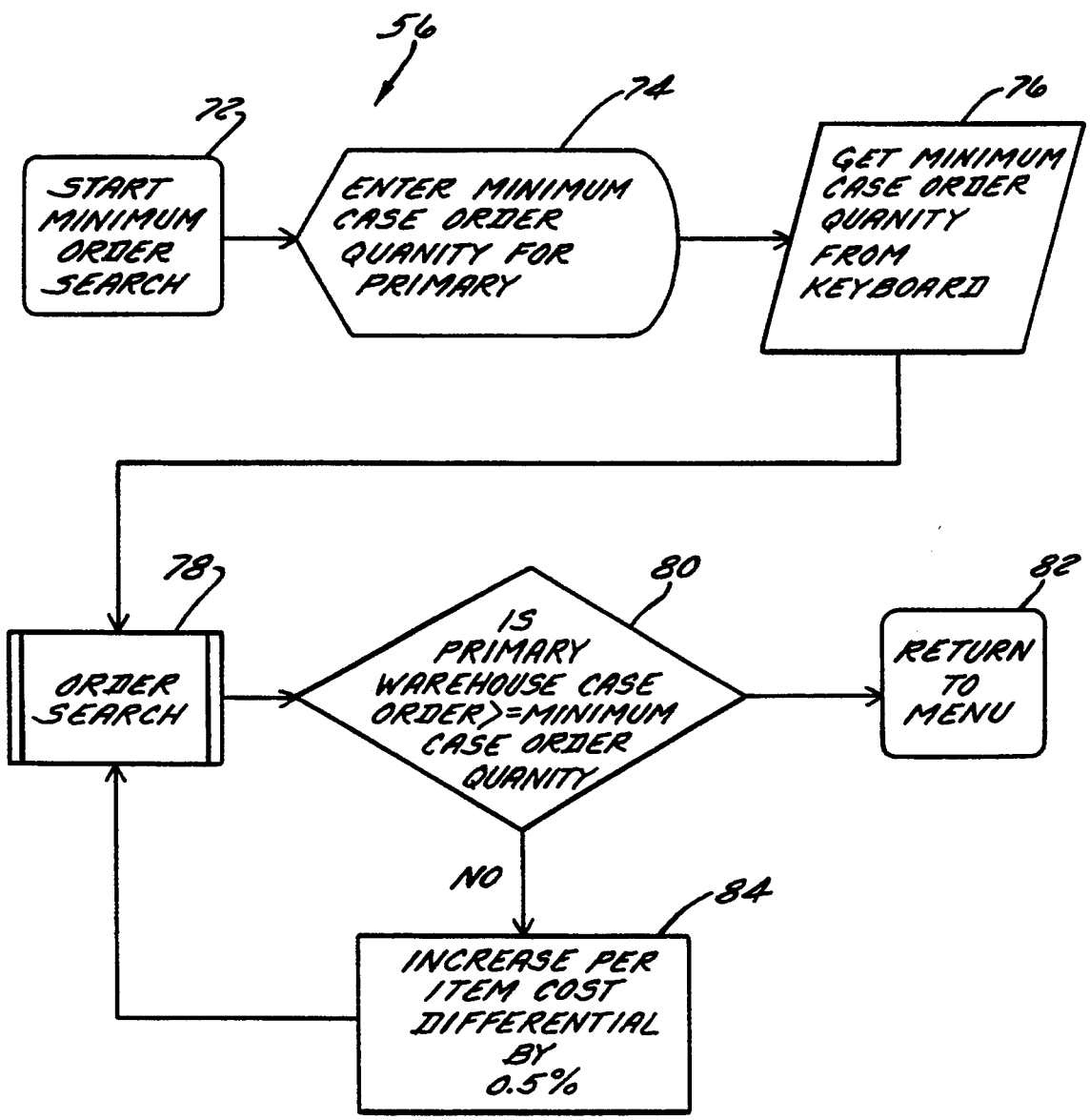
FIG. 4 is a flow chart illustrating the operation of one routine of the menu illustrated in FIG. 3.
Figure 5:
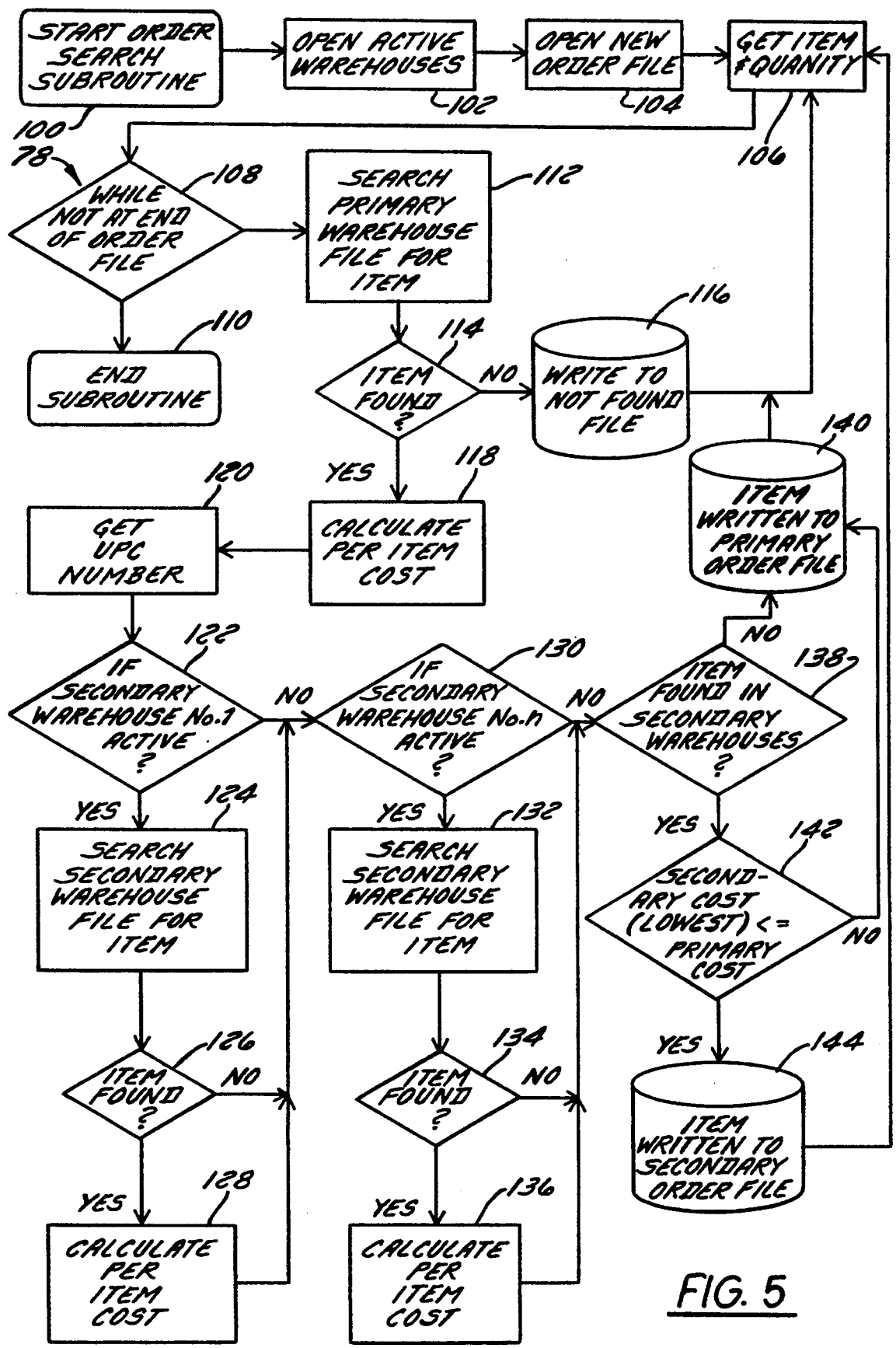
FIG. 5 illustrates a flow chart for the Order Search subroutine of the routine of FIG. 4.

Referring to FIGS. 4 and 5, selecting the Minimum Order Search routine of option 1 at block 56 from the menu of FIG. 3 enables the orderer to conduct a search amongst available warehouses and to order each item from the lowestprice warehouse, assuming that a designated minimum order for the primary warehouse has been met. If the designated minimum order has not been met, the system repeats the search and determines a revised allocation of resources which minimizes total cost to the retailer while still meeting the required minimum order for the primary warehouse 24. This minimum order requirement for the primary warehouse will typically stem from a contractual obligation for the retailer to purchase a certain percentage or certain number of all products ordered from the primary warehouse or to buy a minimum number of products from the primary warehouse. Any number of other considerations could also cause the retailer to want to order a minimum number of items from a designated or primary warehouse.

Upon selecting the Minimum Order Search routine of block 56 in FIG. 3, the routine proceeds from start at block 72 (FIG. 4) and prompts the orderer to enter a minimum case order quantity to be ordered from the primary warehouse at block 74. This information is received from the orderer via the keyboard or other input device of the computer 22 at block 76 and instigates the Order Search subroutine 78 discussed in more detail below. The routine then proceeds to block 80 in which it is determined whether the case order for the primary warehouse is greater than or equal to the minimum case order quantity inputted at block 76. If the answer is yes, the routine returns to the main menu at block 82. If, on the other hand, the answer to the inquiry of block 80 is no, the routine determines that the order search routine of block 78 has not allocated resources in a manner which meets the requirements input in blocks 74 and 76 and thus, in block 84, modifies the order search subroutine 78 by increasing the necessary cost per item differential required for selection of the primary warehouse in block 142 of the subroutine 78 in a manner discussed in more detail below. The net result of this interaction between blocks 80 and 84 of the routine and operation of the subroutine 78 results in the desired allocation of resources in which the lowest-priced items are purchased, where possible, while still obtaining the minimum quantity of items from the primary warehouse.

Referring now to FIG. 5, the Order Search subroutine 78 proceeds from start at block 100 to automatically open all active warehouses in the memory of computer 22 in block 102. The definition of "active warehouses" is discussed in more detail below in connection with the fourth option 62 of the routine 50 of FIG. 3. The program then opens a new order file within the computer's memory in block 104 and, in block 106, obtains from the data input by ordering device 32 the quantity "Q" demanded of the first of a plurality "J" of items.

In block 108, the program determines whether or not the last of the J items has been ordered. Since this is the first item, a negative response is received, causing the program to proceed to a search of the computer 24 for the primary warehouse in block 112 for the selected item. If it is determined in block 114 that the item is not found, the absence of that item from the primary warehouse is noted in order file 104 via operation of block 116, and the program returns to block 106 and searches the next item. This automatic return to block 106 rather than a search of the secondary warehouses is performed primarily as a matter of convenience because most retailers start with a bar code for the primary wholesaler which must be translated into a UPC number for searching secondary warehouses. If the item is not found in the primary warehouse, its code cannot be translated into a UPC number and thus cannot be searched in secondary warehouses. It should be understood that the invention is not so limited, and that a single universal code such as a UPC symbol could be used to search all warehouses. Accordingly, the program could proceed to block 122 if the item is not found in the primary warehouse in block 114.

In block 118, the net cost or price per unit item demanded by the primary warehouse is calculated for the item selected in block 106. This is typically done by adjusting the cost per bulk quantity, e.g., case of items with wholesaler and manufacturer rebates and freight charges, etc. and by dividing this price by the number of items per case or other bulk quantity. Rebates and freight charges and other criteria are manually updated via the third option of routine 50 (designated by block 60) discussed in more detail below.

In block 120, a universal symbol such as the UPC symbol for the item is obtained prior to searching of the secondary warehouses. Again, if the universal symbol or code is being used for the entire search routine, it would be unnecessary to obtain the UPC or other universal symbol at this point.

The program then proceeds through a search of secondary warehouses 1–n for the item and determines, for each active warehouse, the net price per unit item demanded by that warehouse. Thus, in the case of warehouse #1, upon ascertaining that the warehouse is active in block 122, the item is searched by UPC or other universal symbol in block 124 and, assuming the item is found in block 126, the net cost per unit item is calculated in block 128. Even if the secondary warehouse 1 is not active or if the item is not found, the functions of blocks 122–128 are repeated for the second secondary warehouse. This process is then repeated for each of the n number of secondary warehouses and, upon the determination that the secondary warehouse "n" is not active in block 130 or that the item is not found in secondary warehouse "n" in block 134 after searching the warehouse in block 132, or upon calculating the net price per unit item demanded by the $n^{th}$ secondary warehouse in block 136, the program proceeds to block 138.

In block 138, the program first determines if the item selected in block 106 was found in at least one of the secondary warehouses 1–n. A negative answer to this inquiry would indicate that the item is not available from any warehouse other than the primary warehouse and would result in the automatic writing of an order for this item in the order file for the primary warehouse in block 140. If, on the other hand, it is determined in block 138 that at least one active secondary warehouse is capable of delivering the item selected in block 106, the program proceeds to block 142 in which the lowest of the net prices or costs demanded by the secondary warehouses is compared to the net price or cost demanded by the primary warehouse. If any of the secondary warehouses offer the goods at a net price which is less than that demanded by the primary warehouse, an order is written to the order file for the lowest priced secondary warehouse in block 144. After the operation of either block 140 or 144, the program proceeds to block 106 where the second of the J items is selected, and the process is repeated. The program returns to the main routine 56 and enters block 80 only when it is determined in block 108 that all of the J items have been searched, at which point the program proceeds to end at block 110.

The orders written in blocks 140 and 144 are not final but may be replaced if it is determined in block 80 of the main routine 56 that the primary warehouse case order is not greater or equal to the minimum case order quantity input in block 76. In this case, the subroutine of block 78 is repeated with all other criterion being identical but with the operation of block 142 being modified such that the lowest price secondary warehouse is selected only if the net price demanded is less than the net price demanded by the primary warehouse by a designated amount "L" which, in the present example, is at least 0.5%. Thus, items which had previously been selected for ordering from the secondary warehouses will now be selected from the primary warehouse unless the savings for the secondary warehouse is greater than this 0.5% differential. The minimum order search routine 56 will keep cycling between blocks 78, 80, and 84, increasing the inquiry in block 142 of routine 78 by increments of 0.5%, until the minimum case order for the primary warehouse is greater than or equal to the number input in block 76. Thus, the cycling between blocks 78, 80, and 84 terminates when the difference between the primary and secondary warehouses exceeds the smallest multiple integer of amount "L" resulting in the designated order for the primary warehouse. Although this may require several iterations, it does result in the ordering of as many items as is practical from the lowest price secondary warehouse while still meeting the minimum order requirement for the primary warehouse.

It should be understood that reference to "case order" above merely designates the total number of items to be ordered from the primary warehouse. For instance, if a given item is normally shipped in cases of ten items, and if the contract with the primary warehouse requires the ordering of at least 100 cases of some combination of items, items will be ordered either from the primary or secondary warehouse in blocks of ten cases. However, depending on the circumstances, including the relationship between the retailer and the primary warehouse, the minimum order could be based on the number of individual items, the volume of items being ordered, the weight of items being ordered, or any other criterion.

Edit Warehouse Routine

The Edit Warehouse routine chosen by block 58 of the routine 50 of FIG. 3 need not be used at all if a fixed number of warehouses are to be searched at all times or the warehouse conditions are constant. However, as a practical matter, the list of suppliers available to a given retailer is ever changing, as is information about each of those suppliers. Thus, inclusion of an edit warehouse function and the associated subroutines is desired to provide greater flexibility to the system. Referring now to the FIGS. 6-9, the Edit Warehouse routine illustrated in block 58 proceeds from start at block 150 and prompts the user as to whether he or she wants to add, delete, or modify the existing warehouse file in block 152. After this choice is obtained in block 154, it is determined in block 156 whether the orderer wishes to add a warehouse name. If the answer to this inquiry is yes, the computer prompts the user for entry of a warehouse name in block 158, and this name is entered in block 160. The warehouse is then added to the computer's memory via an operation such as that performed by the subroutine of block 162.

Figure 7:
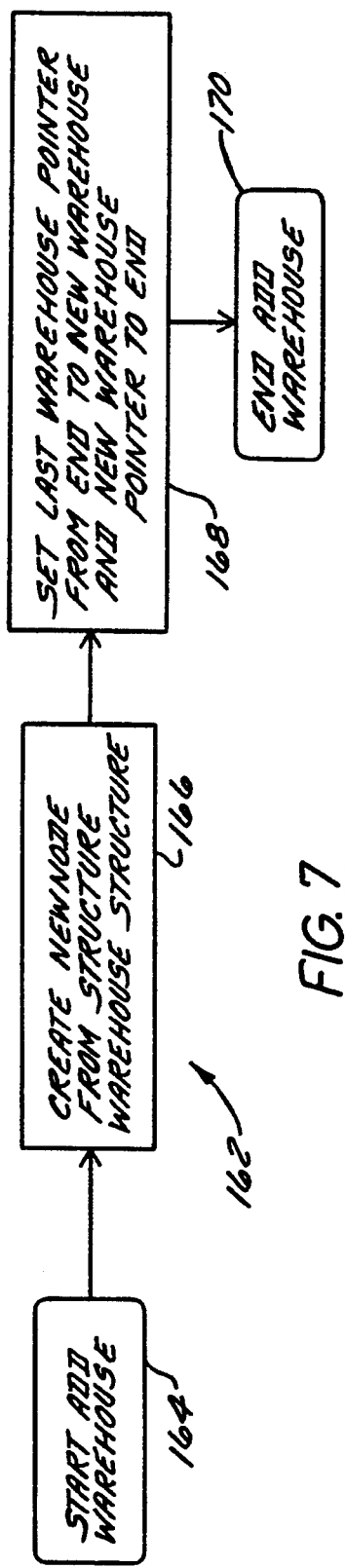

Storing and accessing data in the computer's memory may be performed via any of a variety of well known procedures. It is preferred, however, that data be stored in "nodes" in the primary memory (RAM), because the RAM can be searched more rapidly than the secondary memory (hard drive). Referring to FIG. 7, one possible procedure for adding a warehouse name is represented by subroutine 162 and proceeds from start at block 164 to block 166 to create a new node in the memory corresponding to the new warehouse. This new node structure essentially contains a list of information about a warehouse in addition to the name such as freight charges, rebates, warehouse names, etc. This also correlates existing information about a warehouse such as product size, cost, etc. to the format required for communication between the retailer's computer and that of the wholesaler. The actual information is input upon the prompting for the information by the computer. Block 168 of subroutine 162 represents an internal housekeeping function performed by the computer to make room for the new node created in block 166. In this step, the computer inserts the new node created in block 166 into the circle of existing nodes within the computer's memory and shifts the existing odes as necessary to accommodate the new node. The programming of the computer to perform the shifting operation of block 168, as well as the remaining procedures of subroutine 162, is well known to those skilled in the computer programming art and need not be discussed in greater detail.

After completion of subroutine 162 in block 170, the main routine 58 is resumed in block 172 by prompting the orderer for additional information which may be identical to that prompted for in block 152. If no additional information is desired to be inputted, the routine 58 proceeds to end at block 174, and the routine returns to the main menu 50 of FIG. 3.

If the inquiry of block 156 indicates that a warehouse is not to be added, the routine proceeds to block 176 to determine if a warehouse is to be deleted. If the answer to the inquiry of block 176 is yes, the routine proceeds to block 178 and prompts the orderer to inform the computer of which of the existing warehouses is to be deleted from the list of available warehouses. After the desired warehouse is obtained from the order in block 179, the subroutine of block 180 is called to delete the selected warehouse.

Figure 9:
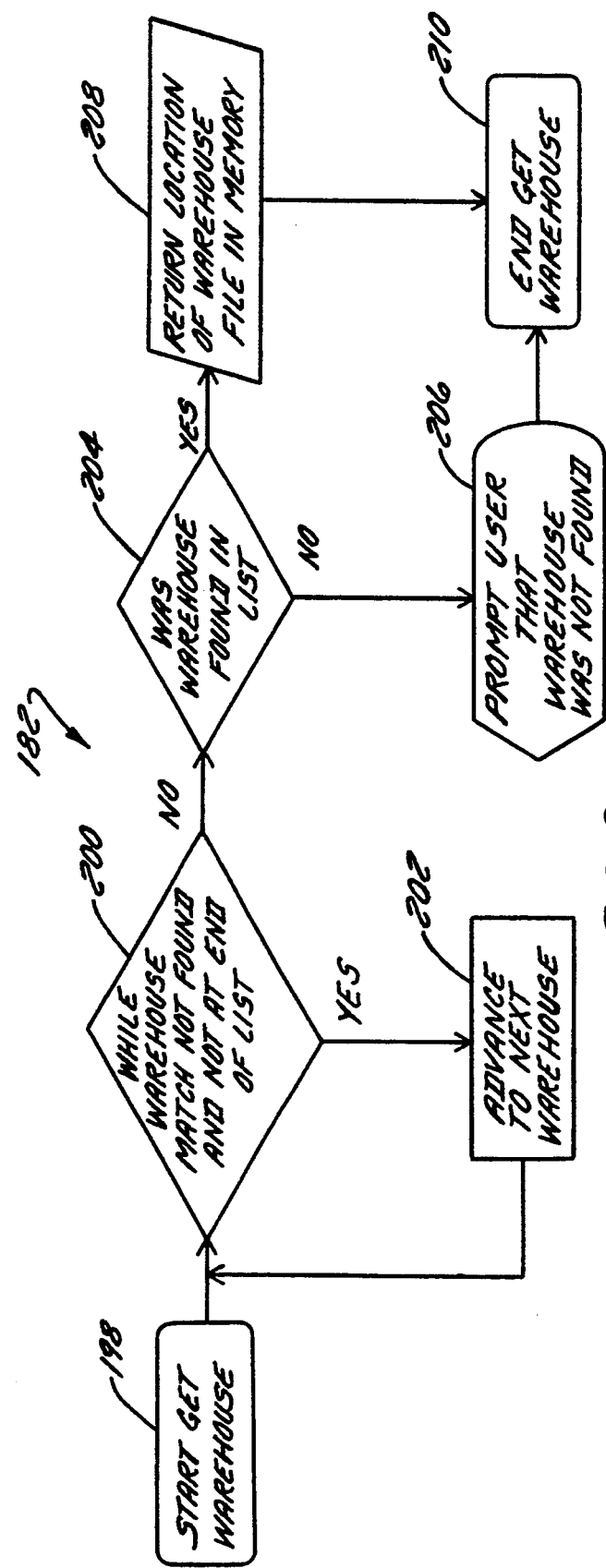
Figure 6:
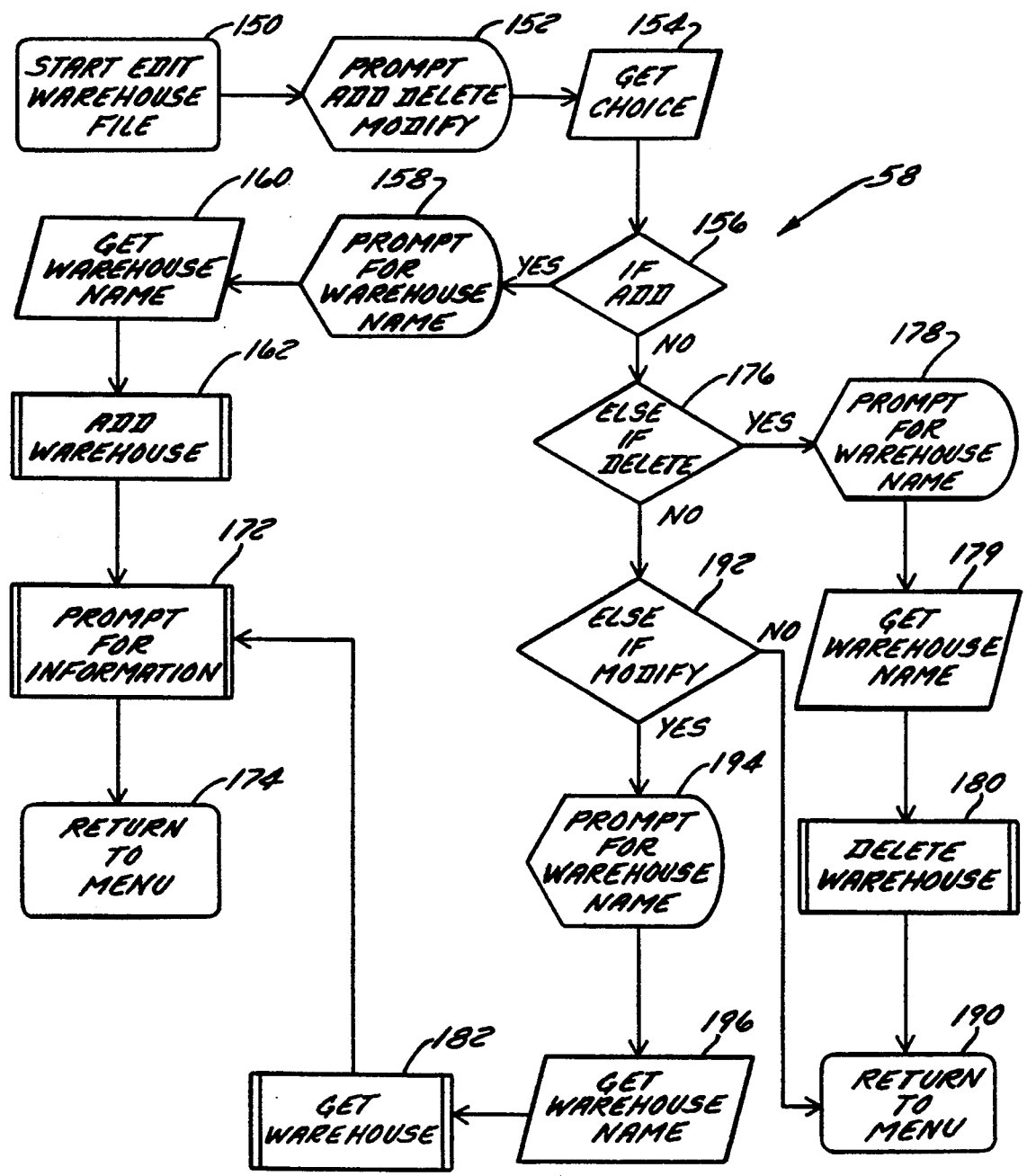
FIG. 6 is a flow chart of the routine for another of the choices illustrated in FIG. 3.

Referring to FIG. 8, the Warehouse Delete subroutine of block 180 proceeds from start at block 181 and calls up the Get Warehouse subroutine of FIG. 9 at block 182 to find the node representing the desired warehouse in the existing nodes of the computer's memory. This subroutine is discussed in more detail below. After the desired warehouse is obtained in block 182, the existing string of nodes in the computer's memory is updated, the previous warehouse pointer is set to the next warehouse, and the next warehouse pointer is set to the previous warehouse in block 184, thus effectively deleting the warehouse from the computer's memory. The node which had contained the information regarding the deleted warehouse is then cleared in block 186, and the program returns to the main routine 58 in block 188. The functions performed in blocks 184 and 186 are well known and can be easily programmed into the computer by those skilled in the computer programming art, and thus will not be discussed in greater detail. Upon completion of the Delete Warehouse subroutine in block 188, the routine 58 may terminate and return to the main menu at block 190 as illustrated in FIG. 6, or, alternatively, may return to block 152 or 172.

If the answers to the inquiries of both blocks 156 and 176 are no, the routine proceeds to block 192 to determine whether or not a warehouse is to be modified. If the answer to the inquiry of block 192 is no, the routine proceeds to end at block 190. If the answer is yes, the routine will prompt the user for the desired warehouse name in block 194, will obtain that name in block 196, and will implement the Get Warehouse subroutine of block 182. This subroutine, illustrated in FIG. 9, proceeds from start at block 198 and, in block 200, determines for a first node designating a warehouse in the computer's memory, whether or not the warehouse corresponding to the first node matches the name of the warehouse input by the orderer. If the node representative of the warehouse in question is not the last node and also does not represent the desired warehouse, the subroutine will cause the computer to advance to the next node or warehouse in block 202 and will repeat the inquiry of block 200. These two blocks thus cause the subroutine to continue to search through the list of existing nodes corresponding to warehouses of record until the end of the list is found or until the desired warehouse is found. In block 204, it is determined whether the warehouse entered by the orderer was found in the list of warehouses searched in block 200. If the answer in block 204 is no, the user is informed of this fact in block 206, and the program returns to the main routine 58 of FIG. 6 in block 210. If, on the other hand, it is determined in block 204 that the warehouse was located in the computer's memory, the location of the node representative of this warehouse is tagged in the computer's memory in block 208 before returning to the main routine of block 58 via block 210. (The functions of each of blocks 200–208 can be easily programmed by those skilled in the computer programming art.)

Whether or not the desired warehouse is located by the subroutine of block 182, the computer prompts for more information in block 172 for reasons similar to those discussed above in connection with the Add Warehouse subroutine of block 162. For instance, if the warehouse is not found in block 206 of subroutine 182, the computer may inform the user of this fact in block 172 and ask the user to input another warehouse name. If, on the other hand, the warehouse is found and its location in the computer's memory tagged in block 208, the computer will provide a listing of information about the selected warehouse which may be edited or updated by the user. This listing may include any variety of information instead of or in addition to the information obtained by the Freight/Rebate routine 60 discussed in more detail below. After the desired information has been inputted upon receiving the suitable prompts from block 172, the routine 58 returns to the main menu routine 50 of FIG. 3.

Edit Freight/Rebate Charges Routine

Referring again to FIG. 3, the operator may also wish to update information about existing warehouses which changes relatively frequently and which thus requires greater accessibility and easier management than the Edit Warehouse routine 58 of FIG. 3. Accordingly, the routine 50 preferably includes another choice 60 permitting the user to edit and update existing information about rebates being offered, freight costs, and other information about the warehouses which may vary quite often.

Figure 10:
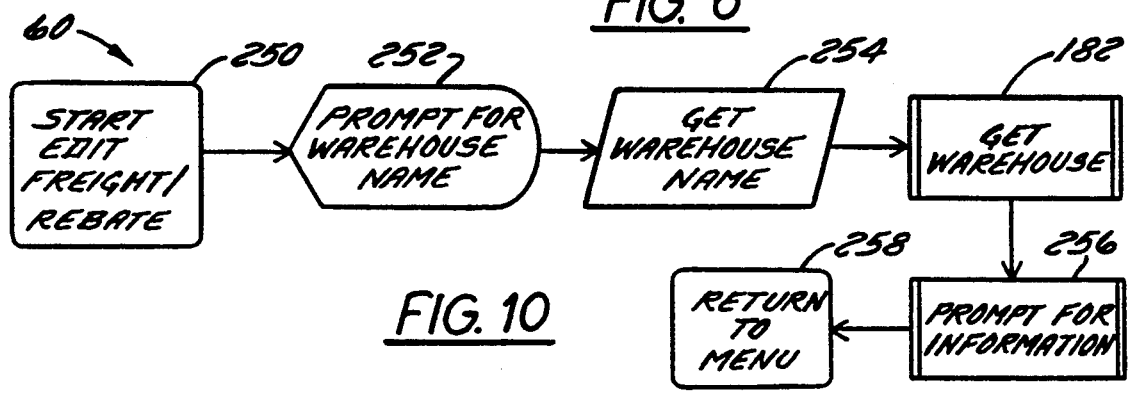
FIG. 10 is a flow chart of the routine of another choice illustrated in FIG. 3.

Referring to FIG. 10, the Edit Freight/Rebate routine 60 proceeds from start at block 250 and prompts the user for the name of the warehouse the information about which is to be updated in block 252. The name of the warehouse to be edited is then received in block 254, and the Get Warehouse subroutine 182 is initiated as discussed above to tag the location of the desired warehouse in the computer's memory. After the desired warehouse has been located, the possible information to be updated such as freight costs, rebates, etc., are displayed and edited in block 256, and the program returns to the main menu in block 258.

It can thus be seen that the operation of the Edit Freight/Rebate routine 60 is nearly identical to that of the modified warehouse portion of the Edit Warehouse routine 58 discussed above. However, this routine is faster and easier to implement because it displays fewer prompts and requires fewer choices by the orderer. It is thus better suited for modifying or updating information which must be updated relatively frequently. Of course, this entire routine could be deleted altogether and the functions thereof could be incorporated into the routine 58 for editing warehouses.

Activate/Deactivate Warehouse Routine

Referring now to FIG. 11, the Activate/Deactivate Warehouse routine 62 of FIG. 3 permits the user or orderer to activate a desired number "m" of the "n" secondary warehouses. The term "activate" as used herein thus means that the computer is instructed to search only selected warehouses in subsequent routines. This routine will thus typically be run prior to the Minimum Order Search routine 66, 68, discussed below. This routine yet again reflects the realities faced by retailers in their day-to-day businesses. For instance, assuming that the retailer knows that a given warehouse cannot deliver items in a time period required by the retailer, there is no need for the retailer to search through the files of this warehouse because the warehouse will not be able to deliver the desired items on time. There may be any other number of reasons why the retailer may or may not want to include a given warehouse in a given search. Thus, the routine 62 permits the retailer to "activate" or "deactivate" warehouses and thus to ensure that only those warehouses which the retailer wants to search in a given session will in fact be searched.

Referring now to FIG. 11, the Activate/Deactivate routine 62 proceeds from start at block 270, prompts for the warehouse name to be activated in block 272, and receives this name from the orderer via keyboard or some other input device in block 274. The Get Warehouse subroutine 182 is then implemented and the warehouse is found in the computer's memory in the manner discussed above. Then, in block 276, the computer interfaces with the orderer to either activate or deactivate the selected warehouse. This interface can take the form of a single simple command such inputted by the orderer before returning to the main menu 50 in block 278. The manner of the interface and the programming of the activate/deactivate routine 62 will depend on a particular application and the functions of its individual blocks are easily programmed by those skilled in the art. Virtually any routine which permits the orderer to select a designated number "m" of the "n" secondary warehouses for subsequent search purposes could be used.

Edit Order File Routine

The routines illustrated in FIGS. 6–11 will typically be implemented prior to or at the beginning of a given search session. However, after a search such as the Minimum Order Search routine 56 or the Maximum Volume Search routine 66 of FIG. 3 is completed, and the resulting order files created, it is preferable that these order files be available for editing by the orderer prior to transmission to the computers of the selected warehouses. Such editing provides flexibility to the system to permit the ordering of items so as to allocate resources in a manner which may not otherwise be taken into account by the system. For instance, many warehouses offer rebates or allowances for a particular item for only a designated time. The retailer may thus have incentive to order more items than would otherwise be ordered so as to take advantage of increased savings which occur during this limited time. Thus, upon reviewing an order file and noting that the price demanded by a particular warehouse is unusually low and/or that a low price offered by a particular warehouse will only be offered for a limited time, the retailer may wish to increase the quantity of that particular item ordered from that particular warehouse.

Figure 12:
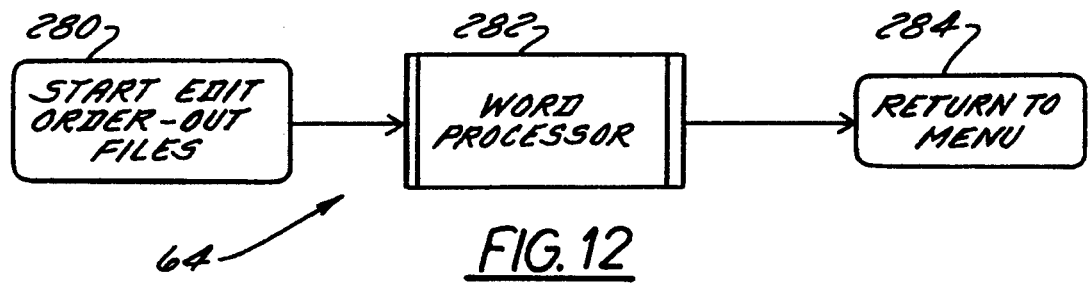
FIG. 12 is a flow chart of a routine of yet another choice illustrated in FIG. 3.

Referring now to FIG. 12, editing of a particular order file is permitted simply by calling up the Edit Order File routine 64 which proceeds from start at block 280 to create a manually readable and editable file via a conventional word processing program in block 282. The file could be arranged in a user friendly format, e.g., it could calculate and display the total costs of items ordered from each of the warehouses, and could also calculate and display total savings and savings per item. This file can thus be edited to alter the order file created by the routine 56 or 66 in any desired manner. After the order file is edited, the routine 64 converts the manually editable file back into a format suitable for transmission to the computers of the primary and secondary warehouses before returning to the main menu 50 at block 284.

If the computer for the retailer is electronically linked to the computers for the warehouses of the wholesalers, the routine 64 may also automatically order the selected items from the selected warehouses prior to returning to the main menu in block 284. Alternately, the routine may output the order files to disk or print to hard copy, thus permitting the ordering of the items from selected warehouses via some other manner.

Maximum Volume Search Routine

Figure 13:
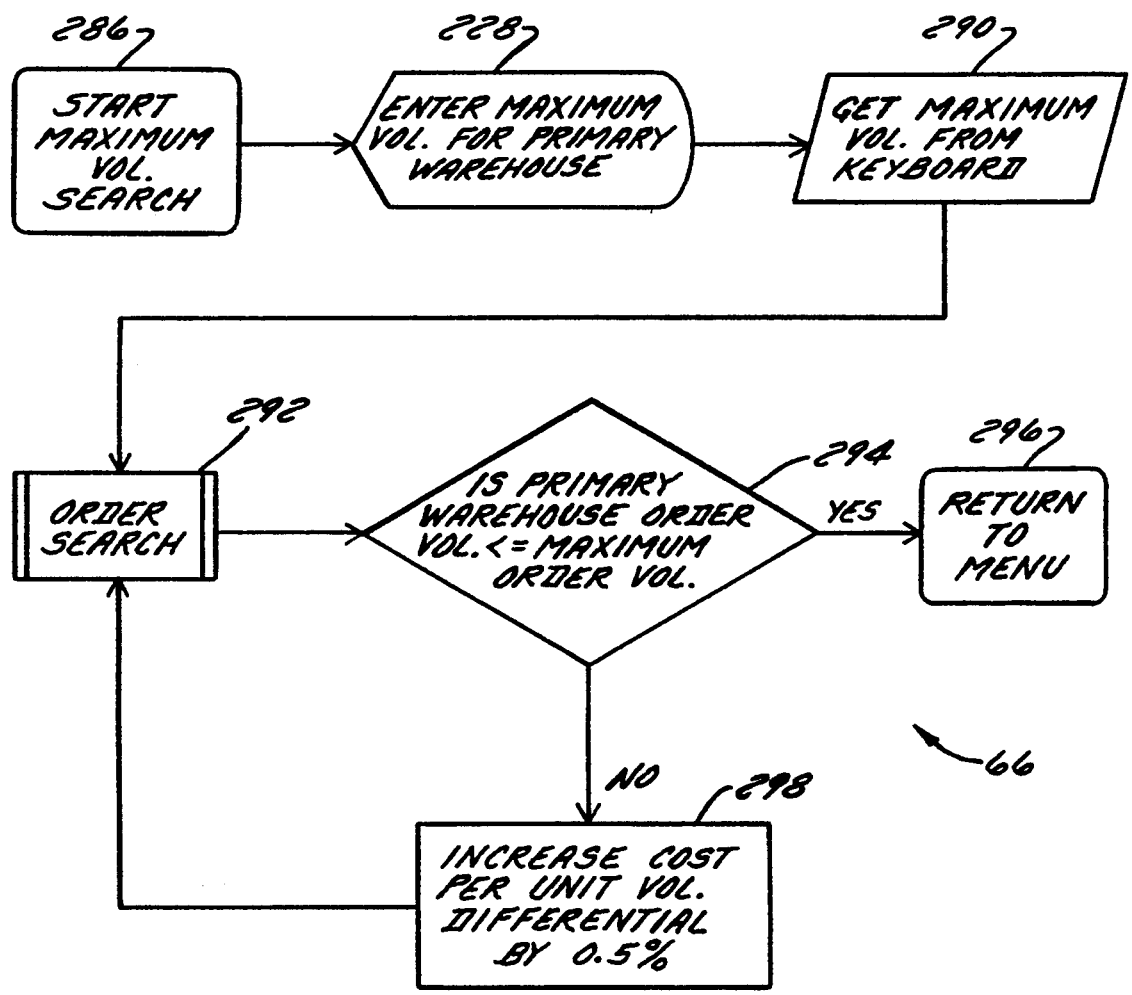
FIG. 13 is a flow chart of a routine of yet another choice illustrated in FIG. 3.
Figure 14:
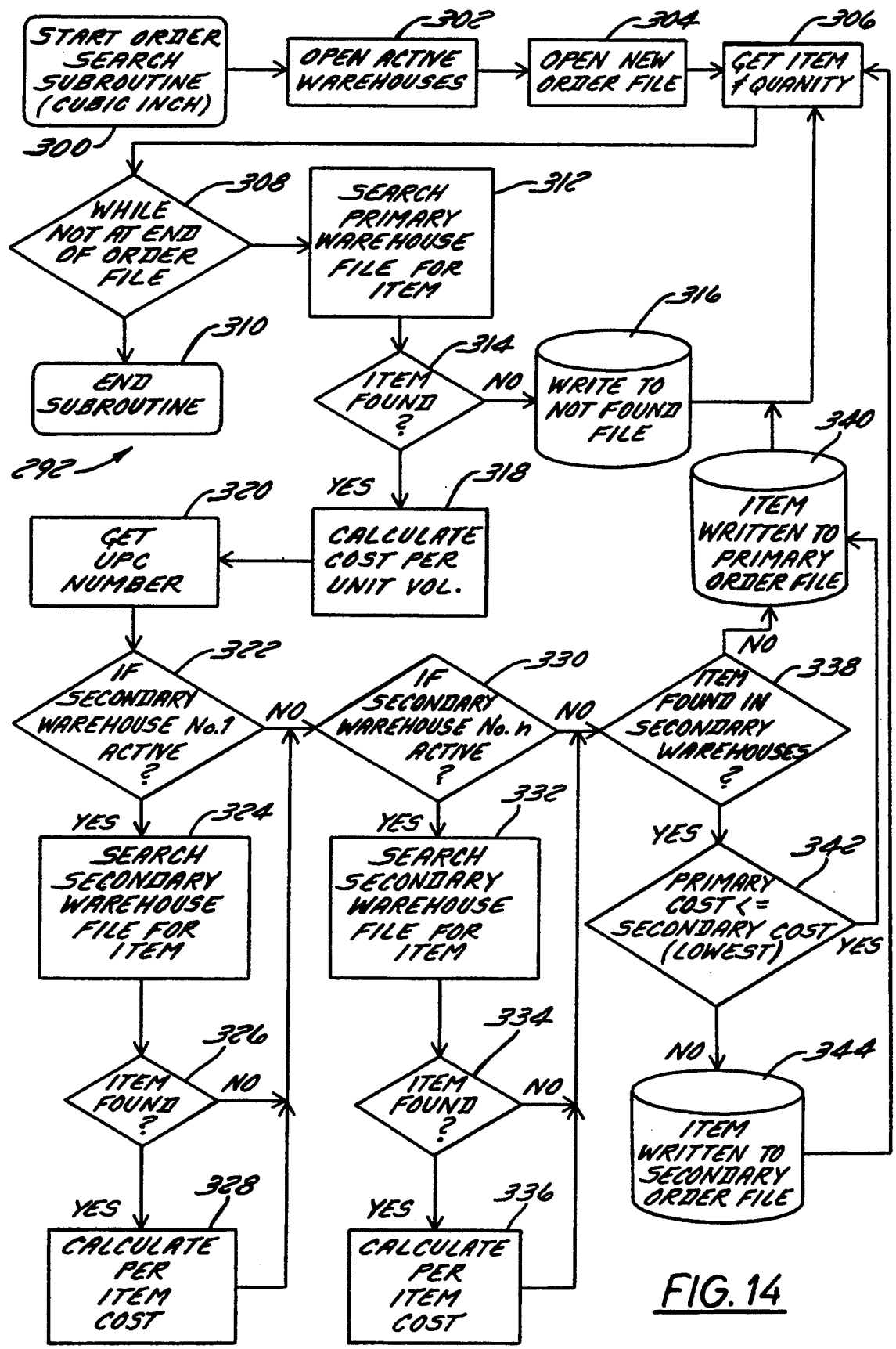
FIG. 14 is a flow chart of an Order Search subroutine of the routine of FIG. 13.

Referring now to FIGS. 3, 13, and 14, the Maximum Volume Search routine 66 from the menu 50 of FIG. 3 is similar to the Minimum Order Search routine 56 to the extent that it permits the orderer to efficiently allocate resources among wholesalers while accommodating the realities of day-to-day business practice. This routine is designed to accommodate for the reality that the quantity of items to be delivered by a particular warehouse is limited by space on a carrier such as a truck or by the weight limits of that carrier. Thus, an order which would otherwise be transmitted to a primary warehouse for cost optimization may have to be reduced so as to fit within designated space and/or weight requirements.

Referring to FIGS. 13 and 14, this allocation is effected by the routine 66 of FIG. 13 which proceeds from start at block 286, prompts the orderer for the entry of maximum volume (or weight) in block 288, and receives this information from the orderer in block 290. The program then proceeds to block 292 in which the Order Search subroutine is implemented and creates order files for those warehouses which are capable of delivering the designated items at the demanded times and which can deliver those items at the lowest net cost or price per unit volume or per unit weight.

Referring to FIG. 14, the Order Search subroutine 292 is nearly identical to the Order Search subroutine 78 implemented in the routine 56. Accordingly, the blocks of FIG. 14 have been numbered with reference numerals which are increased by 200 with respect to the corresponding blocks in FIG. 5. Only those blocks implementing a different operation from that implemented by a corresponding block of the subroutine 78 of FIG. 5 will be described so as to avoid undue repetition.

The first difference between routine 292 and the subroutine 78 can be found in block 318 in which, instead of calculating the net cost per unit item of the item selected in the preceding block 316, the net cost per unit volume or per unit weight is calculated. This calculation will take into account all relevant rebates, freight charges, etc. and will divide the net cost of the item demanded by the primary warehouse by the item's volume or weight. The net cost per unit weight or volume demanded by each of the "m" number of active secondary warehouses is similarly calculated in blocks 328 and 336. It can thus be seen that the routine 292, after completing block 338, differs from the routine 78 only in that net cost per unit volume or weight is calculated for each item as opposed to net cost per unit item.

In block 342, it is determined whether the net price or cost per unit volume or weight demanded by the primary warehouse is less than or equal to the lowest of the net costs or prices demanded by the "m" active secondary warehouses for the selected item. If the answer to the inquiry of block 342 is yes, an order for the demanded quantity of the selected item is written to the primary order file in block 340. If, on the other hand, it is determined in block 342 that the net cost per unit weight or volume demanded by the lowest cost secondary warehouse is less than that demanded by the primary warehouse, an order is written to the secondary order file for the lowest cost secondary warehouse in block 344.

After termination of subroutine 292, the routine 66 determines in block 294 whether or not the total volume or weight of all items written to primary order file 340 in subroutine 292 is less than or equal to the maximum order volume or weight input in block 290. If the answer to the inquiry of block 294 is yes, no modifications to the created order files will be required because there will be adequate space on the carrier to transport the demanded goods from the primary warehouse to the retailer. Accordingly, the program proceeds to return at block 296. If, on the other hand, it is determined in block 294 that the order volume or weight for the primary warehouse is greater than the maximum order volume or weight, the program proceeds to block 298, which will modify the inquiry of block 342 of subroutine 292 to prevent the selection of the primary warehouse for the delivery of a certain item unless the difference in cost per unit volume or weight between the lowest-cost secondary warehouse and the primary warehouse is at a designated amount "L", which is, in the present example, 0.5%. The order search routine 292 is then rerun using this altered criterion to create new order files, and the program then returns to block 294, where the inquiry therein is repeated. The routine cycles from blocks 294, 298, 292 and back again, increasing the cost differential in the inquiry of block 342 by 0.5% in each iteration, until the answer to inquiry of block 294 is yes, thus resulting in an order meeting the designated volume or weight constraints for the primary warehouse.

Sort Routine

The Minimum Order Search routine 56 and Maximum Volume Search routine 66 automatically create order files which can be transmitted to the computers of the primary warehouse 24 and secondary warehouses 26, 28, etc. to order the demanded items. However, it may be desirable in some instances to simply "comparison shop" among existing warehouses and to display information about cost and savings to the orderer without actually creating an order file. Routine 68 of FIG. 3 accommodates this need, using the basic routines of either FIGS. 4 and 5 or FIGS. 13 and 14 to generate information about the relative costs of obtaining the desired quantities of one or more items from each of a plurality of active warehouses and to display this information to the orderer in a readable format. If desired, this option could be further simplified by comparing the cost per unit item or per unit weight or volume of the primary warehouse to the lowest cost secondary warehouse using the basic subroutine of FIGS. 5 or 14 without taking any other factors into account.

Alternative Minimum Order Search Routine And Other Possible Variations

The Minimum Order Search routine discussed above and illustrated in FIGS. 4 and 5 adequately allocates resources between primary and secondary warehouses while still meeting a minimum required order for the primary warehouse. However, implementation of that routine is relatively time-consuming because every active warehouse is searched for each item each time an item is ordered. Such repetitive searching would not be necessary if the lowest-cost warehouse for a particular item were already known.

In addition, the adjustment of a given order to meet the minimum order requirement for the primary warehouse is not exact because, as discussed above in connection with FIG. 4, all items which are offered by secondary warehouses at less then the then-existing multiple of the price differential L are ordered from the primary warehouse. This could conceivably result in the ordering of items from the primary warehouse considerably above the minimum order quantity, thus resulting in an unnecessarily inefficient allocation of resources.

The first-mentioned drawback can be overcome by sorting between warehouses prior to the creation of order files. More specifically, an initial search of all or essentially all items could be automatically conducted to determine which warehouse offers a particular item at the lowest net price or cost per unit item. Such a search could be performed automatically on a relatively infrequent, e.g., weekly basis and would preferably performed at night or during other off-hours. Subsequent manually-initiated searches could be performed on a more frequent, e.g., daily basis to actual order desired quantities of particular items.

Figure 15:
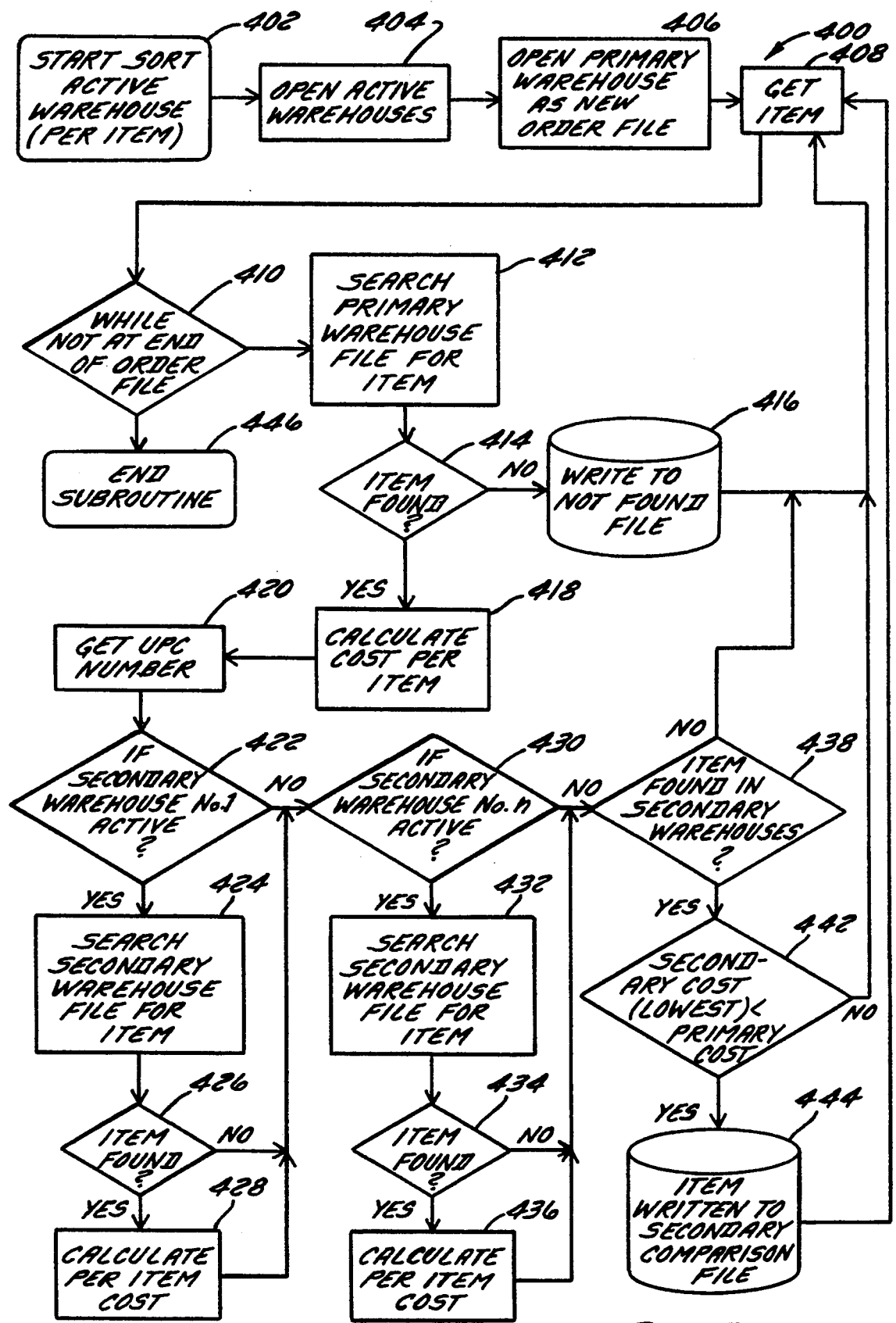
FIGS. 15–17 are flow charts illustrating routines which may be used in place of the routine of FIGS. 4 and 5.

Referring to FIGS. 15, the initial search may be performed by a Sort Active Warehouse routine 400 which proceeds from start at block 402 to open all active warehouses at block 404. Warehouses are designated as active or inactive via the routine described above in connection with FIG. 11. An order file for the primary warehouse 24 is then opened in block 406 and the first of a quantity Q of items is obtained in block 408. The quantity Q differs from the quantity J discussed above in connection with block 106 of subroutine 78 because this quantity is typically much higher than the quantity J and could include every item stocked by the retailer or, preferably, could include every item stocked by the primary warehouse. The file of block 408 is preferably a permanent or semi-permanent file which is updated only when the retailer or primary warehouse stocks a new item or discontinues the stocking of an existing item. Since the item is being obtained only for sorting purposes and not for ordering, there is no need to be concerned with the quantity of a given item. Thus, block 408 further differs from block 106 of the previous embodiment in that only the item is obtained.

In block 410, the program determines whether or not the last of the Q items has been ordered. Since this is the first item, a negative response is received, causing the program to proceed to search the computer 24 for the primary warehouse for the selected item in block 412. If it is determined in block 414 that the item is not found, the absence of that item from the primary warehouse is noted in a not found file in block 416 and the program returns to block 408 and searches the next item. As before, this automatic return is a matter of convenience and not of necessity.

In block 418, the net cost or price per unit item demanded by the primary warehouse 24 is calculated for the item selected in block 408. This is typically done by adjusting the cost per bulk quantity in the manner discussed above in connection with block 118 of the previous embodiment. The obtaining of the universal symbol for the item in block 420, like the function of the corresponding block 120 of the first embodiment, is likewise a matter of convenience which could be deleted if desired.

In blocks 422–436, the program proceeds through a search of the active secondary warehouses for the item selected in block 408 and determines, for each active warehouse carrying the item, the net price or cost per unit item demanded by that warehouse. It can thus be seen that the functions performed in blocks 422–436 are identical to those performed in blocks 122–136 of the previous embodiment illustrated in FIG. 5.

In block 438, the program determines if the item selected in block 408 was found in at least one of the active secondary warehouses. A negative answer to this inquiry indicates that the item is not available from any warehouse other than the primary warehouse. However, rather than immediately writing an order to a primary warehouse order file, the program returns to block 408.

If, on the other hand, it is determined in block 438 that at least one active secondary warehouse is capable of delivering the item selected in block 408, the program proceeds to block 442 in which the lowest of the net prices or costs demanded by the secondary warehouses is compared to the net price or cost demanded by the primary warehouse. If any of the secondary warehouses offers the item at a net price per unit item which is less than that demanded by the primary warehouse, an order is written, not to an order file as in the previous embodiment but to a secondary warehouse comparison file in block 444. The routine terminates only when it is determined in block 410 that all of the Q items have been searched, at which point the program proceeds to end at block 446.

It can thus be seen that the routine results in the creation of a secondary warehouse order file in block 444, containing for each of the items offered by the secondary warehouses, the warehouse offering that particular item and the net price or cost per unit item demanded by that warehouse. No order file is created for items which are not offered by a secondary warehouse at a lower net price or cost per unit item than the primary warehouse.

Figure 16:
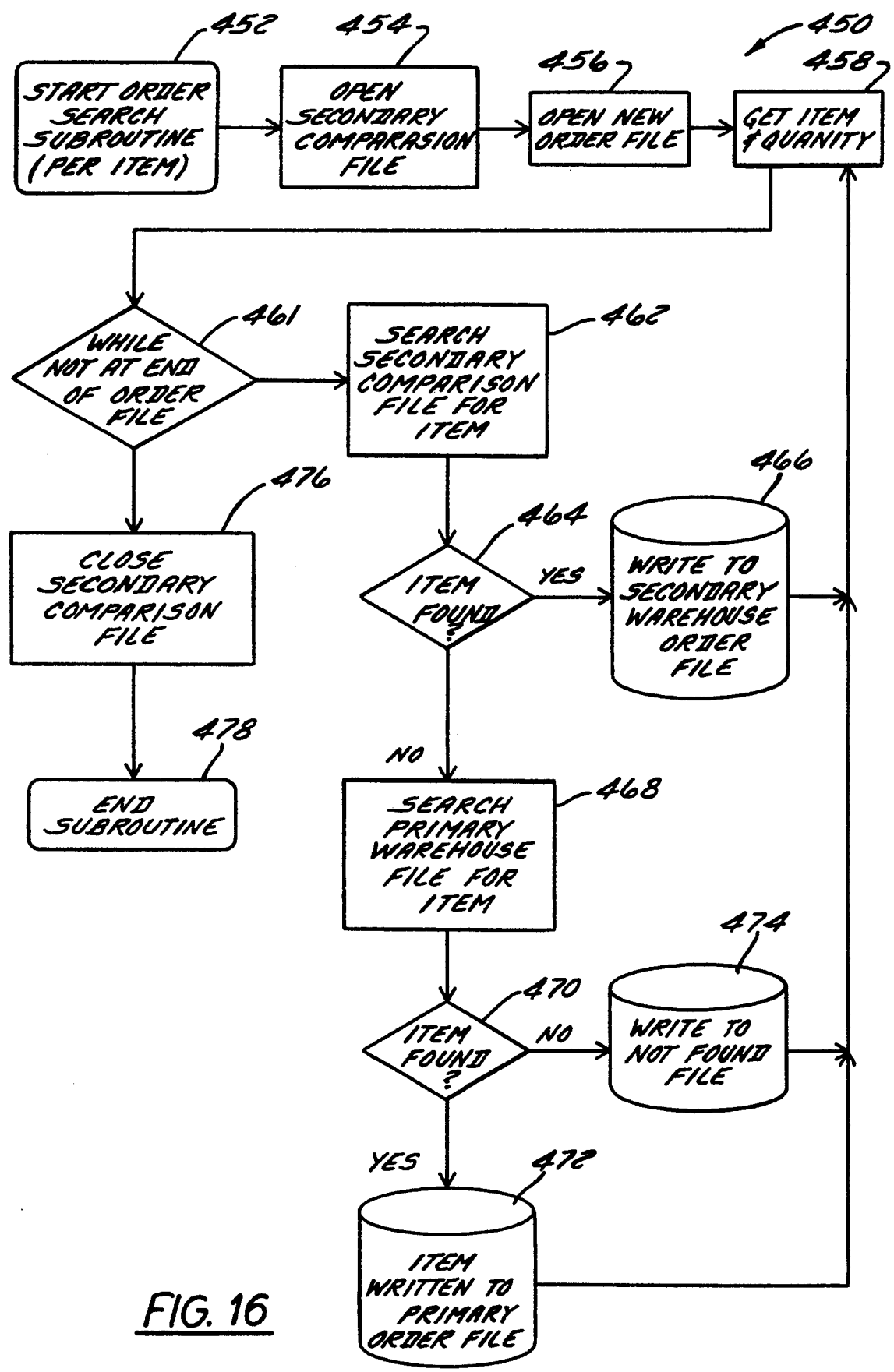

Referring to FIG. 16, the actual ordering of items, taking place relatively frequently and typically initiated manually, is effected by implementing the order search routine 450, which proceeds from start at block 452 to open the secondary warehouse comparison file, created in block 444 of the routine 400, in block 454. After creating a new order file in block 456, the desired quantity of each of items to be ordered in this session will be obtained in turn in block 458. Data accessed in this block may be entered via a procedure identical to that discussed in connection with block 106 of the first embodiment discussed above.

In block 410, the program determines whether or not the last of the J items has been ordered. Since this is the first item, a negative response is received, causing the program to search the secondary warehouse comparison file of block 444 for the item in block 462. In block 464, the program determines whether or not the item selected in block 458 was found in the secondary warehouse comparison file. A positive answer to this inquiry results in the writing of an order for the demanded quantity of the selected item in the secondary warehouse order file in block 466. A negative answer to the inquiry of block 464, on the other hand, causes the computer to search the primary warehouse file for that item in block 468. In block 470, it is determined whether the item was found in the primary warehouse, and, if so, an order is written to the primary warehouse order file in block 474. If the item is not found in block 470, the item is written to a not found file in block 474 before the routine returns to block 458. The routine proceeds in this matter until the last of the J items is retrieved in block 408 and searched, after which the program proceeds from block 410 to close the secondary warehouse file in block 476 and ends in block 478.

Upon completion of routine 450, the secondary warehouse order file 456 may contain orders for not one but for all of the active secondary warehouses. For reasons discussed below, the items written in the secondary warehouse order file 466 should be ranked by the highest to lowest savings per unit item. After completion of routine 500 discussed below, but before transmission to the warehouses, this file needs to be broken down into individual order files for the respective secondary warehouses. Such functions could be performed by those skilled in computer programming art with little effort.

The routine 450 is faster than the routine of FIG. 15 or even the routine 78 of FIG. 5 because it does not search each of the warehouses for a particular item every time but, instead, only searches a relatively small secondary order file for the item and, if not found there, then proceeds to a search of the order file for the primary warehouse.

The routines of FIGS. 15 and 16 could be used with the Minimum Order Search routine of FIG. 4, with the routine of FIG. 16 taking the place of subroutine 78 of FIG. 5. However, the routine of FIG. 4 could be replaced entirely by the routine 500 of FIG. 17. This routine proceeds from start at block 502 and determines, in block 504, if quantity of items to be ordered from the primary warehouse is less than the minimum order quantity input by the orderer. If the answer to this inquiry is no, thus indicating the minimum order quantity from the primary warehouse has been met, the routine proceeds to end at block 506. If, on the other hand, the inquiry of block 504 results in a positive answer, rather than repeating the entire search routine, the required quantity of the last (lowest savings) of the items present in the secondary warehouse order file 466 is deleted from that order file and written to the primary warehouse order file, thus resulting in only a negligible increase in the cost of a total order.

If deleting all of the last of the items from the secondary warehouse order file is insufficient to result in a negative answer to the inquiry of block 504, some, or, if necessary, all of the desired quantity of the next-to-last item is deleted from the secondary warehouse order file and added to the primary warehouse order file in block 508. Blocks 504 and 508 are repeated as necessary to create an order for exactly the desired minimum order quantity from the primary warehouse. This routine is thus faster and simpler to implement than corresponding blocks of the routine 56 of FIG. 4. This routine is also more efficient since, assuming that orders must be revised to meet the minimum order requirement, orders are revised only to the extent required to meet and not to exceed the exact minimum order requirement for the primary warehouse.

Figure 17:
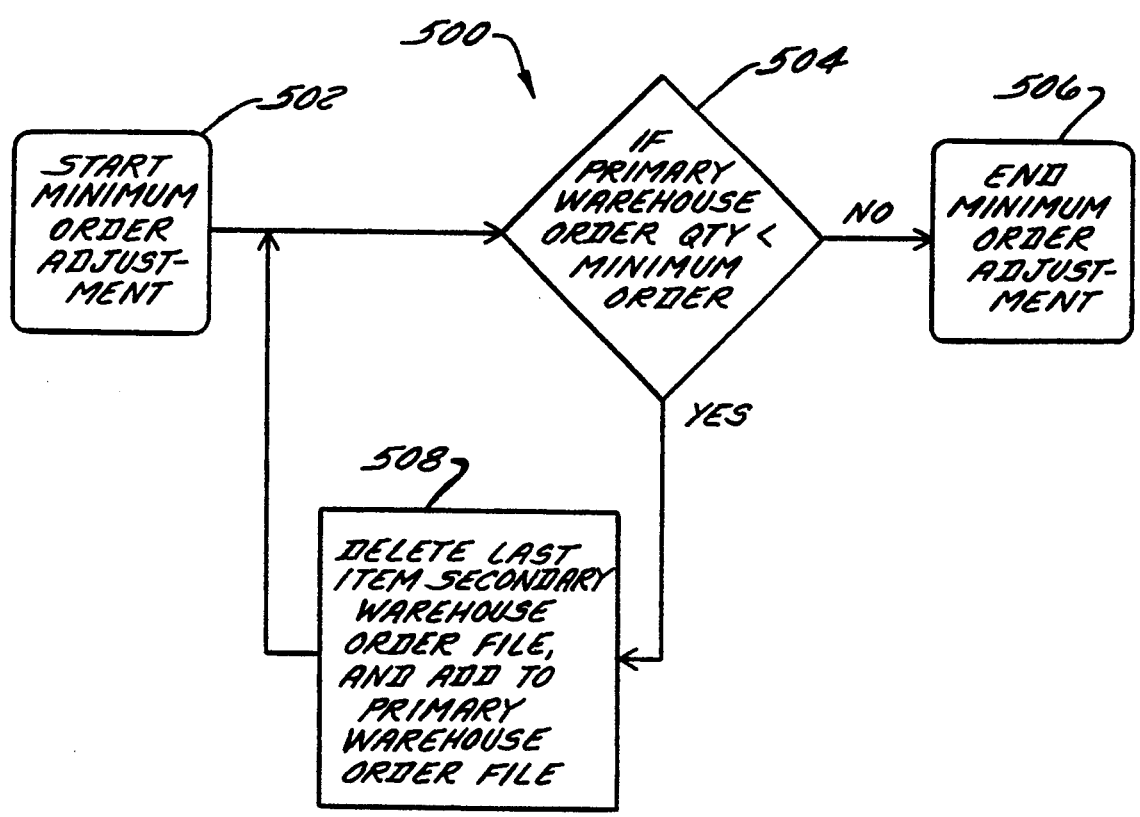

It should be noted that the routines of FIGS. 15-17, though relating to a searching by minimum price or cost per unit item, could also be searched on the basis of minimum price or cost per unit volume, minimum price or cost per unit weight, or virtually any other criterion.

It should be understood that the foregoing detailed description relates only to preferred embodiments of the invention and that many changes and modifications could be made to the invention without departing from the spirit and scope thereof.

For instance, items could be ordered from the lowest cost warehouse without taking into account minimum order criterion, maximum volume criterion, or any other criterion. In this case, each of the options 1 and 6 designated by the reference numerals 56 and 66 in the main menu routine 50 of FIG. 3 could be replaced by simple order search routines using only the subroutines 78 and 292 of FIGS. 5 and 14. Warehouses could be compared to one another based on a wide variety of criterion instead of or in addition to the exemplified criterion discussed above. In addition, as discussed above, the routines of FIGS. 7-10 could be replaced by any routine capable of storing, locating, and retrieving information from the computer's primary memory, secondary memory, or any combination thereof. Other possible changes and modifications will become more readily apparent from a reading of the appended claims.

What is claimed is:

1. A system comprising:
   (A) means, containing information about items offered by a primary warehouse and at least one secondary warehouse, for receiving orders from an orderer for a retailer and for transmitting information about said items to said orderer; and
   (B) means, electronically linked to said means (A) and being operated by said orderer for said retailer, for receiving said information from said means (A) and for creating order files used to order said items from said warehouses, said means (B) including
- (i) means for obtaining said information from said means (A) about each of said items offered by said warehouses,
- (ii) means for evaluating, on an item-by-item basis, the information obtained by said means for obtaining, and for selecting one of said primary and said at least one secondary warehouse for the delivery of each item, based on a predetermined criterion,
- (iii) means, electronically linked to said means (ii), for automatically creating initial order files for ordering said items from said warehouses without reference to a designated ordering criterion for said primary warehouse, said initial order files including an initial order file for said primary warehouse, and
- (iv) means, electronically linked to said means (ii) and said means (iii), for determining whether said designated ordering criterion for said primary warehouse is met by said initial order file for said primary warehouse and, if said designated ordering criterion is not met by said initial order file for said primary warehouse, for causing said means (iii) to create revised order files including a revised order file which meets said designated ordering criterion for said primary warehouse;

wherein said means (i) obtains information from said means (A) relating to prices of items, and wherein said means (ii) determines, for each item, the net price per unit item demanded by each of said warehouses, and selects a warehouse on the basis of the net price demanded per unit item; and wherein said means (ii) initially selects the warehouse offering an item at the lowest net price per unit item, wherein said designated ordering criterion is a designated number of items, and wherein if said means (iv) determines that selection on the basis of lowest net price per unit item alone would result in less than said designated number of items being ordered from said primary warehouse, said means (iv) causes said means (ii) to select said secondary warehouse to deliver a given item only when the difference in price per unit item between said primary warehouse and said secondary warehouse exceeds the smallest integer multiple of a designated amount L, resulting in the preparation of said revised order file ordering said designated number of items from said primary warehouse.

2. A system comprising:
- (A) means, containing information about items offered by a primary warehouse and at least one secondary warehouse, for receiving orders from an orderer for a retailer and for transmitting information about said items to said orderer; and
- (B) means, electronically linked to said means (A) and being operated by said orderer for said retailer, for receiving said information from said means (A) and for creating order files used to order said items from said warehouses, said means (B) including
  - (i) means for obtaining said information from said means (A) about each of said items offered by said warehouses,
  - (ii) means for evaluating, on an item-by-item basis, the information obtained by said means for obtaining, and for selecting one of said primary and said at least one secondary warehouse for the delivery of each item, based on a predetermined criterion,
  - (iii) means, electronically linked to said means (ii), for automatically creating initial order files for ordering said items from said warehouses without reference to a designated ordering criterion for said primary warehouse, said initial order files including an initial order file for said primary warehouse, and
  - (iv) means, electronically linked to said means (ii) and said means (iii), for determining whether said designated ordering criterion for said primary warehouse is met by said initial order file for said primary warehouse and, if said designated ordering criterion is not met by said initial order file for said primary warehouse, for causing said means (iii) to create revised order files including a revised order file which meets said designated ordering criterion for said primary warehouse; wherein said means (ii) selects warehouses based on one of net price per unit weight and net price per unit volume and initially selects the warehouse offering an item at the lowest of said one of net price per unit weight and said net price per unit volume, wherein said designated ordering criterion comprises one of a designated volume and a designated weight, and wherein if said means (iv) determines that items taking up more than said one of said designated weight and said designated volume would be ordered from said primary warehouse using said initial order file for said primary warehouse, said means (iv) causes said means (ii) to select said primary warehouse to deliver a given item only when the difference in said one of said net price per unit weight and said net price per unit volume between said secondary and said primary warehouses exceeds the smallest integer multiple of a designated amount L, resulting in the preparation of said revised order file ordering items taking up no more than said one of said designated weight and said volume from said primary warehouse.

3. A system comprising:
- (A) means, containing information about items offered by warehouses, for receiving orders from an orderer for a retailer and for transmitting information about said items to said orderer; and
- (B) means, electronically linked to said means (A) and being operated by said orderer for said retailer, for receiving said information from said means (A) and for creating order files used to order said items from said warehouses, said means (B) including;
  - (i) means for obtaining said information from said means (A) about each of said items offered by at least two of said warehouses,
  - (ii) means for evaluating, on an item-by-item basis, the information obtained by said means for obtaining, and for selecting one of said at least two warehouses for the delivery of each of said items based on a predetermined criterion, and
  - (iii) means, electronically linked to said means (ii), for automatically creating said order files for ordering said items from said warehouses, wherein said warehouses include a primary warehouse and at least one secondary warehouse, said means (ii) includes means for creating a secondary warehouse comparison file listing only those items offered by a secondary warehouse at a cost which is preferred to that offered by said primary warehouse, and wherein said means (iii) includes means for selecting a particular item to be searched, for searching said secondary warehouse comparison file for said selected item, and for creating order files for ordering said selected item from a secondary warehouse only if said selected item is found in said secondary warehouse comparison file.

4. A system comprising:
(A) means, containing information about items offered by remote warehouses including a primary warehouse and a number n of secondary warehouses, n being greater than one, for receiving orders from an orderer for a retailer and for transmitting information about said items to said orderer; and
(B) means, electronically linked to said means (A) and being operated by said orderer for said retailer, for receiving said information from said means (A), for creating order files used to order a desired quantity of each of a plurality of items from said warehouses, said desired quantity being input by said orderer, and for transmitting said order files to said means (A), said means (B) including
  (i) means for obtaining said information about said plurality of items from said means (A),
  (ii) means, electronically linked to said means (i), for (a) determining an allocation of orders between said primary and secondary warehouses such that said desired quantity of each of said plurality of items is determined to be available from a combination of said primary and secondary warehouses in a combination in which orders are allocated in a designated manner, and (b) creating initial order files based upon said determination, said means (ii) including
    (a) means for initially selecting, based upon a designated selection criterion, one of said warehouses to deliver each of said items, and
    (b) means for creating initial order files reflecting the initial selections;
  (iii) means for determining whether a designated ordering criterion for said primary warehouse is met and, if said designated ordering criterion is not met, for causing said means (ii) to determine a revised allocation of orders which meets said designated ordering criterion for said primary warehouse and to create revised order files based upon said determination, said means (iii) revising said selection criterion when said designated ordering criterion is not met, causing said means (ii)(a) to select one of said warehouses for the delivery of each item based upon the revised selection criterion, and causing said means (ii)(b) to create said revised order files based upon the operation of said means (ii)(a), and further comprising
  (iv) means, electronically linked to said means (ii), for transmitting said revised order files to said warehouses, and
  (v) means, electronically linked to said means (ii), for inputting said designated ordering criterion.

5. A system comprising:
(A) means, containing information about items offered by remote warehouses including a primary warehouse and a number n of secondary warehouses, n being greater than one, for receiving orders from an orderer for a retailer and for transmitting information about said items to said orderer; and
(B) means, electronically linked to said means (A) and being operated by said orderer for said retailer, for receiving said information from said means (A), for creating order files used to order a desired quantity of each of a plurality of items from said warehouses, said desired quantity being input by said orderer, and for transmitting said order files to said means (A), said means (B) including
  (i) means for obtaining said information about said plurality of items offered by said warehouses,
  (ii) means, electronically linked to said means (i), for (a) determining an allocation of orders between said primary and secondary warehouses such that said desired quantity of each of said plurality of items is determined to be available from a combination of said primary and secondary warehouses in a combination in which orders are allocated in a designated manner, and (b) creating initial order files based upon said determination,
  (iii) means for determining whether a designated ordering criterion for said primary warehouse is met and, if said designated ordering criterion is not met, for causing said means (ii) to determine a revised allocation of orders which meets said designated ordering criterion for said primary warehouse and to create revised order files based upon said determination,
  (iv) means, electronically linked to said means (ii), for transmitting said revised order files to said warehouses, and
  (v) means, electronically linked to said means (ii), for inputting said designated ordering criterion, wherein
said means (ii) initially selects the warehouse offering an item at the lowest net price per unit item, wherein,
said designated ordering criterion is a designated number of items, and wherein,
if said means (iii) determines that selection on the basis of lowest net price per unit item alone would result in less than said designated number of items being ordered from said primary warehouse, said means (iii) causes said means (ii) to select said secondary warehouse only when the difference in price per unit item between said primary warehouse and said secondary warehouse exceeds the smallest integer multiple of a designated amount L, resulting in the preparation of said revised order files including a revised order file for said primary warehouse for ordering said designated number of items from said primary warehouse.

6. A system comprising:
(A) means, containing information about items offered by remote warehouses including a primary warehouse and a number n of secondary warehouses, n being greater than one, for receiving orders from an orderer for a retailer and for transmitting information about said items to said orderer; and (B) means, electronically linked to said means (A) and being operated by said orderer for said retailer, for receiving said information from said means (A), for creating order files used to order a desired quantity of each of a plurality of items from said warehouses, said desired quantity being input by said orderer, and for transmitting said order files to said means (A), said means (B) including (i) means for obtaining said information about said plurality of items offered by said warehouses, (ii) means, electronically linked to said means (i), for (a) determining an allocation of orders between said primary and secondary warehouses such that said desired quantity of each of said plurality of items is determined to be available from a combination of said primary and secondary warehouses in a combination in which orders are allocated in a designated manner, and (b) creating initial order files based upon said determination, (iii) means for determining whether a designated ordering criterion for said primary warehouse is met and, if said designated ordering criterion is not met, for causing said means (ii) to determine a revised allocation of orders which meets said designated ordering criterion for said primary warehouse and to create revised order files based upon said determination, (iv) means, electronically linked to said means (ii), for transmitting said revised order files to said warehouses, and (v) means, electronically linked to said means (ii), for inputting said designated ordering criterion, wherein said means (ii) initially selects the warehouse offering an item at the lowest of said one of net price per unit weight and said net price per unit volume, wherein said designated ordering criterion comprises one of a designated volume and a designated weight, and wherein if said means (iii) determines that items taking up more than said one of said designated weight and said designated volume are to be ordered from said primary warehouse, said means (iii) causes said means (ii) to select said primary warehouse only when the difference in said one of said net price per unit weight and said net price per unit volume between said secondary and said primary warehouses exceeds the smallest integer multiple of a designated amount L, resulting in the preparation of said revised order files including a revised order file for ordering items, taking up no more than said one of said designated weight and said volume, from said primary warehouse.

7. A system comprising:

(A) means, containing information about items offered by remote warehouses including a primary warehouse and a number n of secondary warehouses, n being greater than one, for receiving orders from an orderer for a retailer and for transmitting information about said items to said orderer; and (B) means, electronically linked to said means (A) and being operated by said orderer for said retailer, for receiving said information from said means (A) and for creating order files used to order a desired quantity of each of a plurality of items from said warehouses, said desired quantity being input by said orderer, said means (B) including (i) means for obtaining said information about said plurality of items from said means (A), (ii) means, electronically linked to said means (i), for (a) determining an allocation of orders between said primary and secondary warehouses such that said desired quantity of each of said plurality of items is determined to be available from a combination of said primary and secondary warehouses in a combination in which orders are allocated in a designated manner, and (b) creating initial order files based upon said determination, (iii) means for determining whether a designated ordering criterion for said primary warehouse is met and, if said designated ordering criterion is not met, for causing said means (ii) to determine a revised allocation of orders which meets said designated ordering criterion for said primary warehouse and to create revised order files based upon said determination, (iv) means, electronically linked to said means (ii), for inputting said designated ordering criterion, wherein said means (ii) includes means for creating a secondary warehouse comparison file listing only those items offered by a secondary warehouse at a cost which is preferred to that offered by said primary warehouse, and wherein said means (B) further comprises means for selecting a particular item to be searched, for searching said secondary warehouse comparison file for said selected item, and for creating an order file for ordering said selected item from a secondary warehouse only if said selected item is found in said secondary warehouse comparison file.

8. A system as defined in claim 7 wherein said initial order files include a primary warehouse order file and a secondary warehouse order file, and wherein said means (iii) causes said means (ii) to create said revised order files by deleting an order for at least one item from said secondary warehouse order file and by writing a corresponding order to said primary warehouse order file.

9. A system comprising:

(A) means, located at remote warehouses including a primary warehouse and a number n of secondary warehouses, n being greater than one, for receiving orders from an orderer for a retailer and for transmitting information about items to said orderer;

(B) means, located at said retailer and electronically linked to said means (A), for receiving said information from said means (A), and for ordering a desired quantity of each of a plurality j of items from said warehouses, said desired quantity being input by said orderer, said means for ordering including (i) means, located at said retailer and electronically linked to said means (A), for obtaining information about items offered by said primary warehouse and a number m of said secondary warehouses, m being no greater than n, said means for obtaining including means for
  (a) transmitting to said means (A) a batch request for information about said plurality of items offered by said warehouses, and
  (b) receiving replies from said means (A), said means (i) including means for permitting the manual selection of the m secondary warehouses;
  (ii) means, electronically linked to said means (i), for creating an initial order file for each of said primary warehouse and said m number of secondary warehouses, said means (ii) including means for performing the following functions for each of said j items
    (a) determining a net price per unit item demanded by said primary warehouse,
    (b) determining a net price per unit item demanded by each of k secondary warehouses which are capable of delivering each item, k being no greater than m, and
    (c) determining a lowest net price per unit item demanded by said k number of secondary warehouses,
    (d) comparing said net price per unit item demanded by said primary warehouse to said lowest net price per unit item demanded by said k number of secondary warehouses, and selecting a warehouse based on said comparison,
    (e) preparing an initial order file requesting the delivery of said plurality of said items from said selected warehouse;
  (iii) means, electronically linked to said means (ii), for determining whether a designated number of items to be ordered from said primary warehouse has been met and, if said designated number has not been met, for causing said means (ii) to prepare revised order files resulting in the preparation of order files including a revised order file ordering said designated number of items from said primary warehouse, said means (iii) causing said means (ii) to revise said initial order files by altering said comparison such that said lowest-price secondary warehouse is selected only when the difference in price per unit item between said primary warehouse and said lowest-price secondary warehouse exceeds a designated amount L, said means (iii) causing said means (ii) to increase said difference by increments of said amount L until said means (ii) prepares a final order file ordering said designated number of items from said primary warehouse, and
  (iv) means, electronically linked to said means (iii), for permitting manual editing of said final order file; and
(C) means for inputting said batch request into said means (B).

10. A method comprising:
(A) obtaining, via operation of a first computer operated by an orderer for a retailer and electronically linked to further computers of remote warehouses including a primary warehouse and at least one secondary warehouse, information about each of a plurality of items from said computers of said primary warehouse and said at least one secondary warehouse;
(B) evaluating, via said first computer, based on a predetermined criterion, said information received from said warehouses;
(C) initially selecting, via said first computer, one of said warehouses to deliver each of said items based on said evaluating step and creating order files reflecting said initial selections;
(D) inputting a designated ordering criterion for said primary warehouse into said first computer;
(E) determining whether said designated ordering criterion for said primary warehouse is met and, if said designated ordering criterion is not met, repeating said steps (B) and (C) so as to create revised order files including a revised order file meeting said designated ordering criterion for said primary waterhouse; and
(F) transmitting said revised order files to said the computers of said warehouses from said first computer, wherein
said step (B) comprises selecting warehouses based on net price per unit item and initially selecting the warehouses offering items at the lowest net price per unit item and preparing initial order files for the selected warehouses, and wherein
said designated ordering criterion is a designated number of items, wherein
if it is determined in said step (E) that selection on the basis of lowest net price per unit item alone would result in less than said designated number of items being ordered from said primary warehouse, said step (E) comprises selecting said secondary warehouse for the delivery of each item only when the difference in price per unit item between said primary and said secondary warehouse exceeds the smallest integer multiple of a designated amount L, resulting in the preparation of said revised order file for said primary warehouse.

11. A method comprising:
(A) obtaining, via operation of a first computer operated by an orderer for a retailer and electronically linked to further computers of remote warehouses, information about each of a plurality of items from said computers of said primary warehouse and said at least one secondary warehouse;
(B) evaluating, via said first computer, based on a predetermined criterion, said information received from said warehouses;
(C) initially selecting, via said first computer, one of said at least two warehouses to deliver each of said items based on said evaluating step and creating order files reflecting said initial selections; and
(D) inputting a designated ordering criterion for said primary warehouse into said first computer;
(E) determining whether said designated ordering criterion for said primary warehouse is met and, if said designated ordering criterion is not met, repeating said steps (B) and (C) so as to create revised order files including a revised order file meeting said designated ordering criterion for said primary warehouse; and
(F) transmitting said revised order files to the computers of said warehouses from said first computer, wherein
said step (B) comprises selecting warehouses based on one of net price per unit weight and net price per unit volume and initially selecting the warehouses offering items at the lowest of said one of net price per unit weight and said net price per unit volume and preparing initial order files for the selected warehouses, wherein said designated ordering criterion comprises one of a designated volume and a designated weight, and wherein if it is determined in said step (E) that items taking up more than said one of said designated weight and said designated volume are to be ordered from said primary warehouse, said step (E) comprises selecting said primary warehouse only when the difference in said one of said net price per unit weight and said net price per unit volume between said secondary and said primary warehouses exceed the smallest integer multiple of a designated amount L, resulting in the preparation of said revised order file for said primary warehouse.

12. A system comprising:
(A) means, containing information about items offered by a primary warehouse and at least one secondary warehouse, for receiving orders from an orderer for a retailer and for transmitting information about said items to said orderer; and (B) means, electronically linked to said means (A) and being operated by said orderer for said retailer, for receiving said information from said means (A) and for creating order files used to order said items from said warehouses, said means (B) including (i) means for obtaining said information from said means (A) about each of said items offered by said warehouses, (ii) means for evaluating, on an item-by-item basis, the information obtained by said means for obtaining, and for selecting one of said primary and said at least one secondary warehouse for the delivery of each item, based on a predetermined selection criterion, (iii) means, electronically linked to said means (ii), for automatically creating initial order files for ordering said items from said warehouses without reference to a designated ordering criterion for said primary warehouse, said initial order files including an initial order file for said primary warehouse, and (iv) means, electronically linked to said means (ii) and said means (iii), for determining whether said designated ordering criterion for said primary warehouse is met by said initial order file for said primary warehouse and, if said designated ordering criterion is not met by said initial order file for said primary warehouse, for causing said means (ii) to select items based upon a revised selection criterion and for causing said means (iii) to create revised order files including a revised order file which meets said designated ordering criterion for said primary warehouse (v) means, electronically linked to said means (iii) and said means (iv), for transmitting said revised order files to said warehouses;

wherein said means (i) obtains information from said means (A) relating to prices of items, and wherein said means (ii) determines, for each item, be net price per unit item demanded by each of said warehouses, and selects a warehouse on the basis of a designated difference between the net price per unit item demanded by said primary and secondary warehouses, and wherein said means (iv) causes said means (ii) to revise the selection criterion to select a warehouse based on an increased difference in price per unit item demanded by said primary and secondary warehouses.

13. A method comprising:
(A) obtaining, via operation of a first computer operated by an orderer for a retailer and electronically linked to further computers of remote warehouses including a primary warehouse and at least one secondary warehouse, information about each of a plurality of items from said computers of said primary warehouse and said at least one secondary warehouse;

(B) evaluating, via said first computer, based on a predetermined evaluation criterion, said information received from said warehouses;

(C) initially selecting, via said first computer, based upon said evaluating step and upon a designated selection criterion, one of said warehouses to deliver each of said items and creating order files reflecting said initial selections;

(D) inputting a designated ordering criterion for said primary warehouse into said first computer;

(E) determining, via said first computer, whether said designated ordering criterion for said primary warehouse is met and, if said designated ordering criterion is not met, revising said selection criterion and repeating said steps (B) and (C), based on the revised selection criterion, so as to create revised order files including a revised order file meeting said designated ordering criterion for said primary waterhouse; and (F) transmitting said revised order files to said the computers of said warehouses from said first computer.

* * * * *